US012020864B2

(12) United States Patent
Nikseresht Ghanepour et al.

(10) Patent No.: US 12,020,864 B2
(45) Date of Patent: *Jun. 25, 2024

(54) ASSEMBLIES AND PROCESSES FOR PRODUCING OPTICAL EFFECT LAYERS COMPRISING ORIENTED MAGNETIC OR MAGNETIZABLE PIGMENT PARTICLES

(71) Applicant: SICPA HOLDING SA, Prilly (CH)

(72) Inventors: Neda Nikseresht Ghanepour, Lausanne (CH); Mathieu Schmid, Lausanne (CH); Claude-Alain Despland, Prilly (CH); Edgar Mueller, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 228 days.

This patent is subject to a terminal disclaimer.

(21) Appl. No.: 17/264,141

(22) PCT Filed: Jul. 26, 2019

(86) PCT No.: PCT/EP2019/070204
§ 371 (c)(1),
(2) Date: Jan. 28, 2021

(87) PCT Pub. No.: WO2020/025482
PCT Pub. Date: Feb. 6, 2020

(65) Prior Publication Data

US 2021/0319937 A1 Oct. 14, 2021

(30) Foreign Application Priority Data

Jul. 30, 2018 (EP) .................................... 18186284

(51) Int. Cl.
*H01F 41/16* (2006.01)
*B41M 3/14* (2006.01)
(Continued)

(52) U.S. Cl.
CPC ................ *H01F 7/02* (2013.01); *B41M 3/14* (2013.01); *B41M 7/0072* (2013.01);
(Continued)

(58) Field of Classification Search
CPC ... B41J 3/46; B05D 3/207; B05D 5/06; B05D 5/65; B05D 5/61; B05D 5/66; B05D 5/63;
(Continued)

(56) References Cited

U.S. PATENT DOCUMENTS 2,418,479 A 4/1947 Pratt et al.
2,570,856 A 10/1951 Pratt et al.
(Continued)

FOREIGN PATENT DOCUMENTS

CA 2996070 5/2017
CN 101028781 9/2007
(Continued)

OTHER PUBLICATIONS

Office Action and Search Report issued in corresponding Chinese Application No. 201980051010.9 dated Mar. 2, 2022 (and English language translation of the Office Action).
(Continued)

*Primary Examiner* — Tabassom Tadayyon Eslami
(74) *Attorney, Agent, or Firm* — Muncy, Geissler, Olds & Lowe, P.C.

(57) ABSTRACT

The invention relates to the field of the protection of security documents such as for example banknotes and identity documents against counterfeit and illegal reproduction. In particular, the present invention provides processes for optical effect layers (OEL) exhibiting one or more indicia using a magnetic assembly comprising i) a soft magnetic plate (x31) comprising a) one or more voids (V) and b) one or more dipole magnets (x32-*a*), wherein the one or more
(Continued)

dipole magnets (x32-*a*) are disposed within the one or more voids (V) and/or are facing said one or more voids (V), and/or one or more pairs of two dipole magnets (x32-*b*), wherein the dipole magnets (x32-*b*) of the one or more pairs are disposed below the soft magnetic plate (x31) and are spaced apart from the one or more voids (V).

18 Claims, 17 Drawing Sheets

(51) Int. Cl.
*B41M 7/00* (2006.01)
*B42D 25/369* (2014.01)
*B42D 25/378* (2014.01)
*B42D 25/41* (2014.01)
*H01F 7/02* (2006.01)
*B42D 25/23* (2014.01)
*B42D 25/29* (2014.01)

(52) U.S. Cl.
CPC ......... *B42D 25/369* (2014.10); *B42D 25/378* (2014.10); *B42D 25/41* (2014.10); *B42D 25/23* (2014.10); *B42D 25/29* (2014.10)

(58) Field of Classification Search
CPC .... B42D 25/369; B42D 25/29; B42D 25/378; B41M 3/14; H01F 41/16; C09C 1/0015; C09C 2210/00; G06K 19/16; G06K 19/18; B41F 15/00; H01M 4/043
See application file for complete search history.

(56) References Cited

U.S. PATENT DOCUMENTS

| | | | |
|---|---|---|---|
| 3,676,273 A | 7/1972 | Graves | |
| 3,791,864 A | 2/1974 | Steingroever | |
| 4,838,648 A | 6/1989 | Phillips et al. | |
| 5,364,689 A | 11/1994 | Kashiwagi et al. | |
| 5,630,877 A | 5/1997 | Kashiwagi et al. | |
| 6,103,361 A | 8/2000 | Batzar et al. | |
| 6,410,130 B1 | 6/2002 | Schuhmacher et al. | |
| 6,531,221 B1 | 3/2003 | Schuhmacher et al. | |
| 6,582,781 B1 | 6/2003 | Schuhmacher et al. | |
| 6,838,166 B2 | 1/2005 | Phillips et al. | |
| 8,343,615 B2 | 1/2013 | Raksha et al. | |
| 2002/0160194 A1 | 10/2002 | Phillips et al. | |
| 2004/0009308 A1 | 1/2004 | Schlaf et al. | |
| 2007/0172261 A1 | 7/2007 | Raksha et al. | |
| 2007/0200002 A1 | 8/2007 | Raksha et al. | |
| 2011/0290129 A1 | 12/2011 | Gygi et al. | |
| 2013/0084411 A1 | 4/2013 | Raksha et al. | |
| 2014/0290512 A1* | 10/2014 | Raksha | B41F 19/005 101/212 |
| 2015/0352883 A1* | 12/2015 | Schmid | H01F 7/0278 283/73 |

FOREIGN PATENT DOCUMENTS

| | | | |
|---|---|---|---|
| CN | 102529326 B | | 8/2014 |
| CN | 104903009 | * | 9/2015 |
| DE | 2006848 A1 | | 9/1971 |
| EP | 0406667 B1 | | 1/1995 |
| EP | 0710508 A1 | | 5/1996 |
| EP | 0686675 B1 | | 2/1998 |
| EP | 1666546 B1 | | 6/2006 |
| EP | 1710756 A1 | | 10/2006 |
| EP | 1641624 B1 | | 4/2008 |
| EP | 1937415 B1 | | 4/2009 |
| EP | 2155498 A1 | | 2/2010 |
| EP | 2157141 A2 | | 2/2010 |
| EP | 2306222 A2 | | 4/2011 |
| EP | 2325677 A2 | | 5/2011 |
| EP | 2402401 A1 | | 1/2012 |
| TW | 201726265 | | 8/2017 |
| WO | 02/09002 A2 | | 1/2002 |
| WO | 02/073250 A2 | | 9/2002 |
| WO | 02/090002 A2 | | 11/2002 |
| WO | 03/000801 A2 | | 1/2003 |
| WO | 2005/002866 A1 | | 1/2005 |
| WO | 2006/061301 A1 | | 6/2006 |
| WO | 2006/063926 A1 | | 6/2006 |
| WO | 2007/131833 A1 | | 11/2007 |
| WO | 2010/058026 A2 | | 5/2010 |
| WO | 2011/092502 A2 | | 8/2011 |
| WO | 2014/108303 A1 | | 7/2014 |
| WO | 2014/108404 | * | 7/2014 |
| WO | 2014/108404 A2 | | 7/2014 |
| WO | 2015/082344 A1 | | 6/2015 |
| WO | 2015/086257 A1 | | 6/2015 |
| WO | 2016/026896 A1 | | 2/2016 |
| WO | 2016/083259 A1 | | 6/2016 |
| WO | 2017/148789 A1 | | 9/2017 |
| WO | 2018/019594 A1 | | 2/2018 |
| WO | 2018/033512 | * | 2/2018 |
| WO | 2018/033512 A1 | | 2/2018 |
| WO | 2018/054819 A1 | | 3/2018 |

OTHER PUBLICATIONS

Z.Q. Zhu and D. Howe "Halbach permanent magnet machines and applications: a review," IEE. Proc. Electric Power Appl., 2001, 148, p. 299-308.
"Handbook of print media," Helmut Kipphan, Springer Edition, p. 48.
Printing Technology, J. M. Adams and P.A. Dolin, Delmar Thomson Learning, 5$^{th}$ Edition, 2002, pp. 359-360.
Printing Technology, J.M. Adams and P.A. Dolin, Delmar Thomson Learning, 5$^{th}$ Edition, 2002, pp. 293-328.
The Printing ink manual, R.H. Leach and R.J. Pierce, Springer Edition, 5$^{th}$ Edition, 2008, pp. 33-42.
The Printing ink manual, R.H. Leach and R.J. Pierce, Springer Edition, 5$^{th}$ Edition, 2008, pp. 42-51.
The Printing ink manual, R.H. Leach and R.J. Pierce, Springer Edition, 5$^{th}$ Edition, 2008, pp. 58-62.
Benenson, W. et al., Handbook of Physics, Springer 2002, pp. 463-464.
International Search Report and Written Opinion issued with respect to application No. PCT/EP2019/070204.

* cited by examiner

ASSEMBLIES AND PROCESSES FOR PRODUCING OPTICAL EFFECT LAYERS COMPRISING ORIENTED MAGNETIC OR MAGNETIZABLE PIGMENT PARTICLES

FIELD OF THE INVENTION

The present invention relates to the field of magnetic assemblies and processes for producing optical effect layers (OELs). In particular, the present invention provides magnetic assemblies and processes for producing optical effect layers (OELs) into coating layers comprising oriented platelet-shaped magnetic or magnetizable pigment particles and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,273; 3,791,864, DE 2006848-A, U.S. Pat. Nos. 3,676,273, 5,364,689, 6,103,361, EP 0 406 667 B1; US 2002/0160194; US 2004/0009308; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

WO 2011/092502 A2 discloses an apparatus for producing moving-ring images displaying a single apparently moving ring with changing viewing angle. The disclosed moving-ring images might be obtained or produced by using a device allowing the orientation of magnetic or magnetizable particles with the help of a magnetic field produced by the combination of a soft magnetizable sheet and a spherical magnet having its magnetic axis perpendicular to the plane of the coating layer and disposed below said soft magnetizable sheet.

U.S. Pat. No. 9,579,879 discloses methods optical effect layers (OEL) exhibiting indicia. The disclosed method includes covering at least a portion of the substrate with a carrier comprising magnetically alignable flakes, aligning the magnetically alignable flakes with a magnetic field of a magnetic assembly comprising a metal plate with an opening, and solidifying the carrier. The frame is formed at an edge of the opening and the indicia is visible within the frame. The magnetic assembly includes two magnets disposed so that the North Pole of one magnet and the South Pole of another magnet are proximate to the metal plate at opposite sides of the opening. The method disclosed magnetically aligned pigment flakes to form a frame pattern at least partially surrounding indicia and creating the illusory impression that the region has been embossed toward the observer. Such features do not provide a strong sense of change or movement in the frame pattern, and are therefore difficult to rapidly identify and recognize, especially under poor illumination conditions. Therefore, a need remains for means to create highly reflective features that create a strong sense of deformation or movement upon tilting.

WO 2014/108404 A2 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a single loop-shaped body that moves upon tilting of the OEL. Moreover, WO 2014/108404 A2 discloses OELs further exhibiting an optical effect or impression of a protrusion within the loop-shaped body caused by a reflection zone in the central area surrounded by the loop-shaped body. The disclosed protrusion provides the impression of a three-dimensional object, such as a half-sphere, present in the central area surrounded by the loop-shape body.

WO 2014/108303 A1 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a plurality of nested loop-shaped bodies surrounding one common central area, wherein said bodies exhibit a viewing-angle dependent apparent motion.

EP 1 641 624 B1, EP 1 937 415 B1 and EP 2 155 498 B1 disclose devices and method for magnetically transferring indicia into a not yet hardened (i.e. wet) coating composition comprising magnetic or magnetizable pigment particles so as to form optical effect layers (OELs). The disclosed methods advantageously allow the production of security documents and articles having a customer-specific magnetic design.

EP 1 641 624 B1 discloses a device for magnetically transferring indicia corresponding to the design to be transferred into a wet coating composition comprising magnetic or magnetizable particles on a substrate. The disclosed device comprises a body of permanent-magnetic material being permanently magnetized in a direction substantially perpendicular to the surface of said body, wherein the surface of said body carries indicia in the form of engravings, causing perturbations of its magnetic field. The disclosed devices are well suited for transferring high-resolution patterns in high-speed printing processes such as those used in the field of security printing. However, and as described in EP 1 937 415 B1, the devices disclosed in EP 1 641 624 B1 may result in poorly reflecting optical effect layers having a rather dark visual appearance.

EP 1 937 415 B1 discloses an improved device for magnetically transferring indicia into a wet coating composition comprising magnetic or magnetizable pigment flakes on a substrate. The disclosed device comprises at least one magnetized magnetic plate having a first magnetic field and having surface relief, engravings or cut-outs on a surface thereof representing said indicia and at least one additional magnet having a second magnetic field, wherein the additional magnet is fixedly positioned adjacent to the magnetic plate so as to produce substantial overlap of their magnetic fields.

Moving-ring effects have been developed as efficient security elements. Moving-ring effects consist of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1, EP 2 325 677 A2, and U.S. Pat. No. 9,257,059.

EP 2 155 498 B1 discloses a device for magnetically transferring indicia into a coating composition comprising magnetic or magnetizable particles on a substrate. The disclosed device comprises a body subjected to a magnetic field generated by electromagnetic means or permanent magnets, which body carries determined indicia in the form of engravings on a surface of the body. The disclosed body comprises at least one layer of material of high magnetic permeability in which said engravings are formed and wherein, in un-engraved regions of said layer of material of high magnetic permeability, the field lines of the magnetic field extend substantially parallel to the surface of said body inside the layer of material of high magnetic permeability. It is further disclosed that the device comprises a base plate of material of low magnetic permeability supporting the layer of material of high magnetic permeability, wherein said layer of material of high magnetic permeability is preferably deposited on the base plate by galvanization. EP 2 155 498 B1 further discloses that the main direction of the magnetic field lines may be changed during exposure of the layer comprising magnetic or magnetizable particles by rotating, advantageously by 360°, the magnetic field. In particular, EP 2 155 498 B1 discloses embodiments wherein permanent magnets are used instead of electromagnets and wherein the rotation of said permanent magnets may be performed by physical rotation of the magnets themselves. A drawback of the disclosed devices resides in the galvanization process since said process is cumbersome and needs special equipments. Moreover, a significant shortcoming of the disclosed invention is that the process relies on the physical rotation of the permanent magnets to achieve 360° rotation of the magnetic field. This is particularly cumbersome from an industrial point of view as it requires complex mechanical systems. Furthermore, rotating simple magnets as suggested produces essentially spherical pigment flake orientations as shown in the corresponding examples of EP 2 155 498 B1. Such orientations are not well suited to clearly reveal indicia with an eye-catching effect, as the sphere-like effect is superimposed with the indicia. The only method that can be derived from the description to generate relatively flat rotating fields would be to rotate very large magnets, which is impractical. EP 2 155 498 B1 does not teach how to establish a practical industrial process to generate rotating magnetic fields that impart an appealing impression of the indicia.

WO 2018/019594 A1 and WO 2018/033512 A1 disclose processes for producing optical effect layers exhibiting one or more indicia, said process comprising the steps of forming an assembly comprising a substrate carrying the coating layer comprising platelet-shaped magnetic or magnetizable pigment particles and a soft magnetic plate comprising one or more voids, indentations and/or protrusion, moving the assembly through an inhomogeneous magnetic field of a static magnetic-field-generating device so as to bi-axially orient at least a part of the platelet-shaped magnetic or magnetizable pigment particles, and hardening the coating layer. While the visual effects thereof show a strong three-dimensional effect, the visual effect showed limited displacement of the reflected features upon tilting and did not convey the impression of change or deformation. The requirement for an external magnetic field generating device is also a constraint since it can be difficult to accommodate on industrial equipments. There is therefore a need for methods that are easy to implement to create eye-catching effects that are easy to recognize through the impression of deformation and movement that they convey.

Therefore, a need remains for magnetic assemblies and processes for producing customized optical effect layers (OELs) on a substrate with good quality, wherein said processes should be reliable, easy to implement and able to work at a high production speed while allowing the production of OELs exhibiting not only an eye-catching effect but also a bright and well resolved appearance.

SUMMARY OF THE INVENTION

Accordingly, it is an object of the present invention to overcome the deficiencies of the prior art as discussed above. This is achieved by the provision of a magnetic assembly (x30) mounted on a transferring device (TD) and comprising:

i) a soft magnetic plate (x31) made of a composite comprising from about 25 wt-% to about 95 wt-% of spherical soft magnetic particles dispersed in a non-magnetic material, the weight percents being based on the total weight of the soft magnetic plate (x31), wherein the soft magnetic plate (x31) comprises one or more voids (V), and ii) one or more dipole magnets (x32-*a*), wherein the one or more dipole magnets (x32-*a*) are disposed within the one or more voids (V) and/or are facing said one or more voids (V).

Also described herein are printing apparatuses comprising the transferring device (TD) described herein, preferably the rotating magnetic cylinder (RMC) described herein, and at least one of the magnetic assemblies (x30) described herein, said transferring device (TD), preferably said rotating magnetic cylinder (RMC) comprising at least one of the magnetic assembles (x30) described herein and mounted thereon. Also described herein are uses of the printing apparatuses for producing the optical effect layers (OELs) described herein.

Also described herein are processes for producing an optical effect layer (OEL) comprising the steps of:

a) applying onto a substrate (x20) surface a coating composition comprising i) platelet-shaped magnetic or magnetizable pigment particles and ii) a binder material so as to form a coating layer (x10) on said substrate (x20), said coating composition being in a first liquid state;

b) exposing the coating layer (x10) to a magnetic field of the magnetic assembly (x30) described herein; and c) hardening the coating composition to a second state so as to fix the platelet-shaped magnetic or magnetizable pigment particles in their adopted positions and orientations.

Also described herein are optical effect layers (OELs) produced by the process described herein and security documents as well as decorative elements and objects comprising one or more optical OELs described herein.

Also described herein are methods of manufacturing a security document or a decorative element or object, said methods comprising a) providing a security document or a decorative element or object, and b) providing an optical effect layer such as those described herein, in particular such as those obtained by the process described herein, so that it is comprised by the security document or decorative element or object.

Also described herein are uses of the soft magnetic plate (x31) described herein and mounted to the transferring device (TD) described herein together with the one or more dipole magnets (x32-*a*) being disposed within the one or more voids (V) and/or facing said one or more voids (V) as described herein and/or the one or more pairs of dipole magnets (x32-*b*) being disposed below the soft magnetic plate (x31) and being spaced apart from the one or more voids (V) as described herein for magnetically orienting platelet-shaped magnetic or magnetizable pigment particles in a coating layer on a substrate (x20).

The present invention provides a reliable and easy to implement process to produce optical effects layers (OELs), said process comprising orienting platelet-shaped magnetic or magnetizable pigment particles into a coating layer formed from a coating composition in a first state, i.e. not yet hardened (i.e. wet) state, wherein the platelet-shaped magnetic or magnetizable pigment particles are free to move and rotate as to form said optical effect layer (OEL) having hardened the coating layer to a second state wherein orientation and position of the platelet-shaped magnetic or magnetizable pigment particles are fixed/frozen. Once the desire effect is created in the not yet hardened (i.e. wet) coating layer, the coating composition is partly or completely hardened so as to permanently fix/freeze the relative position and orientation of the platelet-shaped magnetic or magnetizable pigment particles in the OEL.

Moreover, the process using the magnetic assemblies described herein provided by the present invention is mechanically robust, easy to implement with an industrial high-speed printing equipment, without resorting to cumbersome, tedious and expensive modifications of said equipment. In contrast, the current invention is very easy to implement on existing equipments and it provided means of generating highly dynamic visual effects that are easily customizable in the form of various shapes that change upon tilting.

BRIEF DESCRIPTION OF DRAWINGS

The optical effect layers (OEL) described herein and their production are now described in more detail with reference to the drawings and to particular embodiments, wherein FIG. 1 schematically illustrates a top view of a soft magnetic plate (131) comprising a void (V), in particular a loop-shaped void (V) having the shape of a heart.

surface and substantially perpendicular to the substrate (1220) surface and having an opposite magnetic direction, wherein said two dipole magnets (1232-*b*) are disposed below the soft magnetic plate (1231) and are spaced apart from the loop-shaped void (V).

Figure 12A:
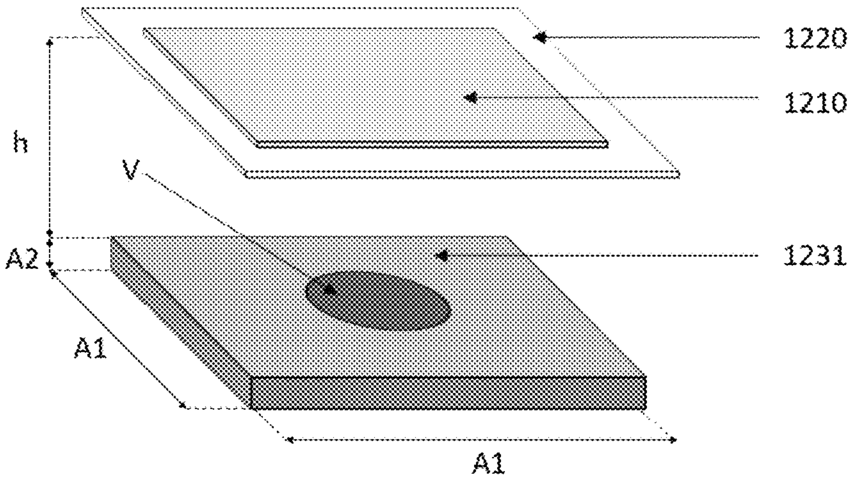
FIG. 12A-C schematically illustrates a process for producing an optical effect layer (OEL) and illustrate a top view (FIG. 12B) and a cross-section (FIG. 12C) of a magnetic assembly (1230) used to produce said OEL, said process comprising the use of i) a magnetic assembly (1230) so as to orient at least a part of platelet-shaped magnetic or magnetizable pigment particles of a coating layer (1210) made of a coating composition comprising said platelet-shaped magnetic or magnetizable pigment particles, wherein the magnetic assembly (1230) comprises i) a soft magnetic plate (1231) comprising a loop-shaped, in particular a circle-shaped, void (V) having a depth less than 100% and ii) a pair of two dipole magnets (1232-*b*) having their magnetic axis substantially perpendicular to the soft magnetic plate (1231)
Figure 12B:
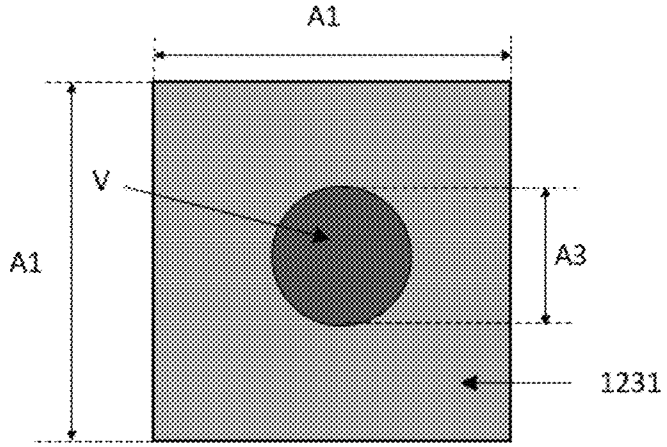
Figure 12C:
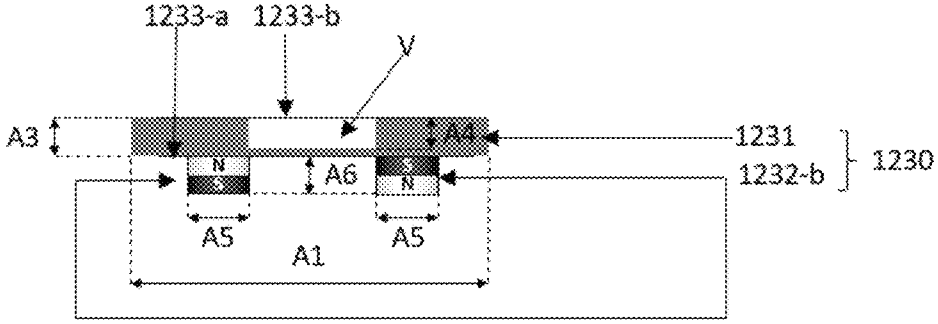
Figure 12D:
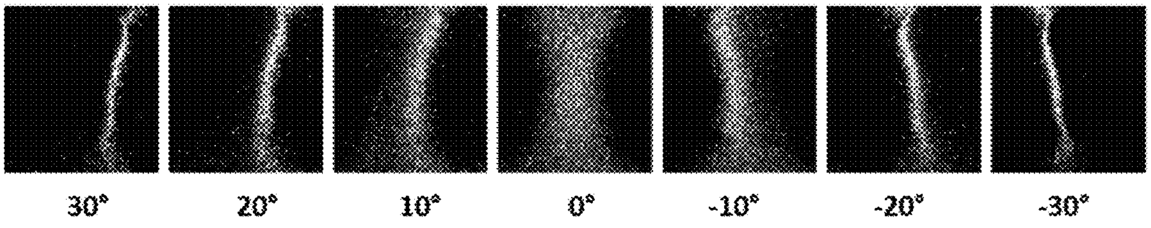

FIG. 12D shows photographic images of an OEL, said OEL being obtained by using the process and the magnetic assembly shown in FIG. 12A-C.

Figure 13A:
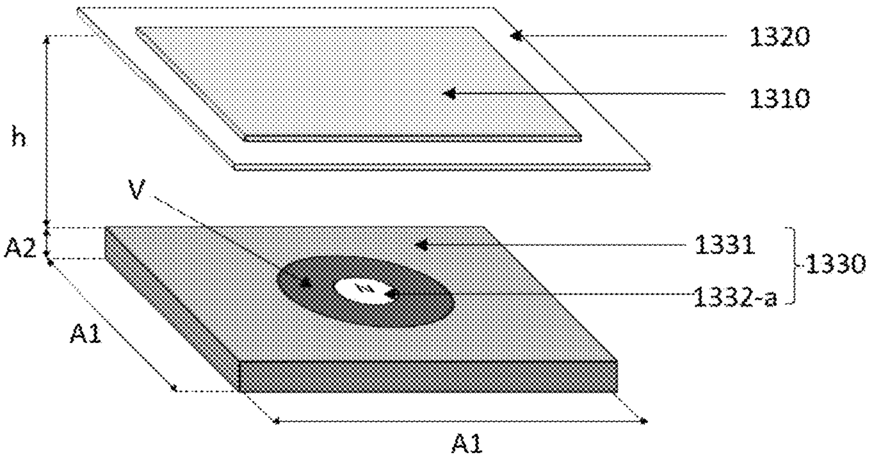
Figure 13B:
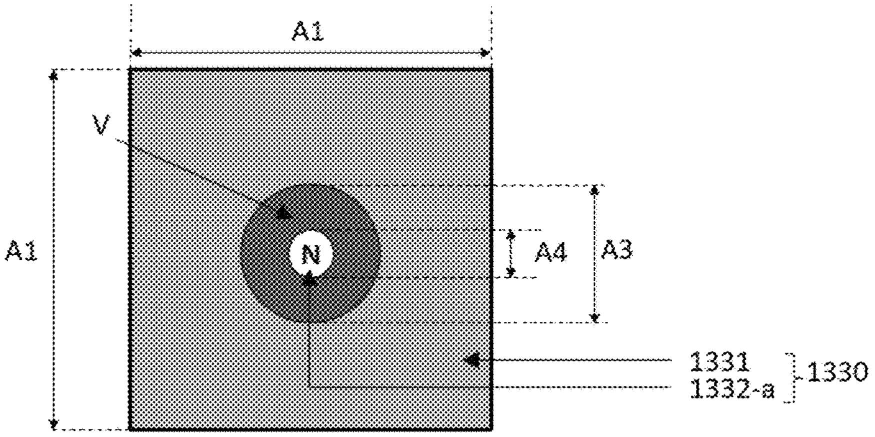
Figure 13C:
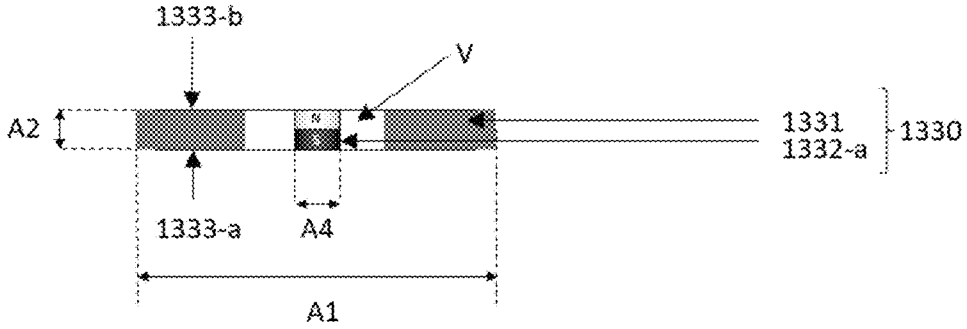

FIG. 13A-C schematically illustrates a process for producing an optical effect layer (OEL) and illustrate a top view (FIG. 13B) and a cross-section (FIG. 13C) of a magnetic assembly (1330) used to produce said OEL, said process comprising the use of i) a magnetic assembly (1330) so as to orient at least a part of platelet-shaped magnetic or magnetizable pigment particles of a coating layer (1310) made of a coating composition comprising said platelet-shaped magnetic or magnetizable pigment particles, wherein the magnetic assembly (1330) comprises i) a soft magnetic plate (1331) comprising a loop-shaped, in particular a circle-shaped, void (V) having a depth of 100% and ii) a dipole magnet (1332-*a*) having its magnetic axis substantially perpendicular to the soft magnetic plate (1331) surface and substantially perpendicular to the substrate (1320) surface, wherein said dipole magnet (1332-*a*) is symmetrically disposed within the loop-shaped void (V).

Figure 13D:
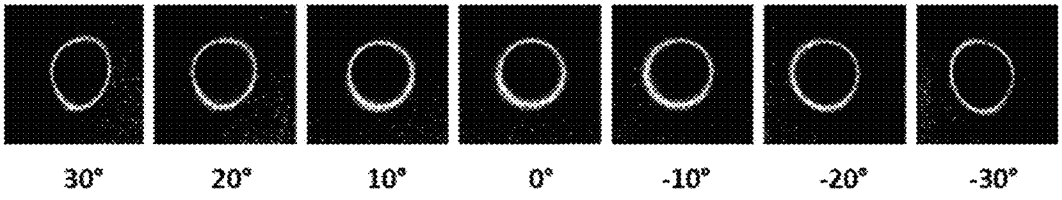

FIG. 13D shows photographic images of an OEL, said OEL being obtained by using the process and the magnetic assembly shown in FIG. 13A-C.

Figure 14A:
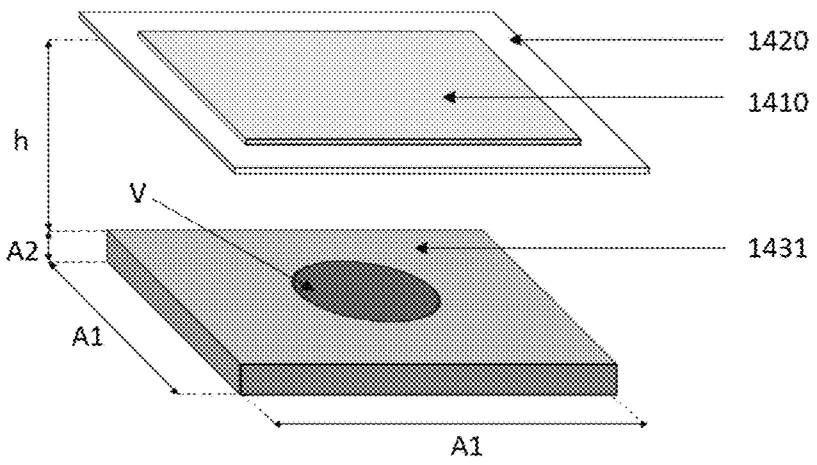
Figure 14B:
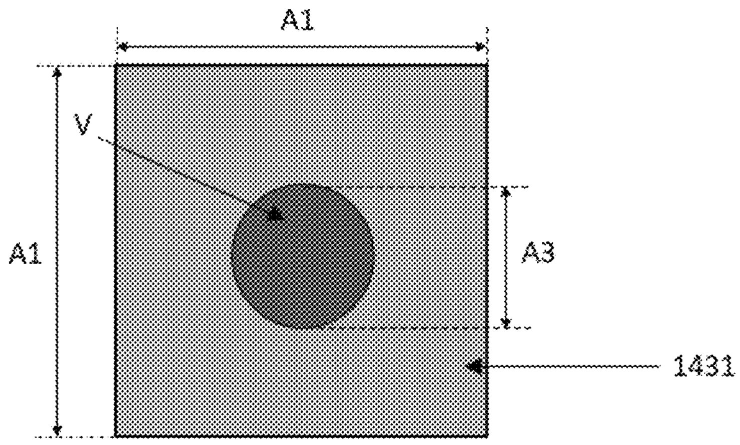
Figure 14C:
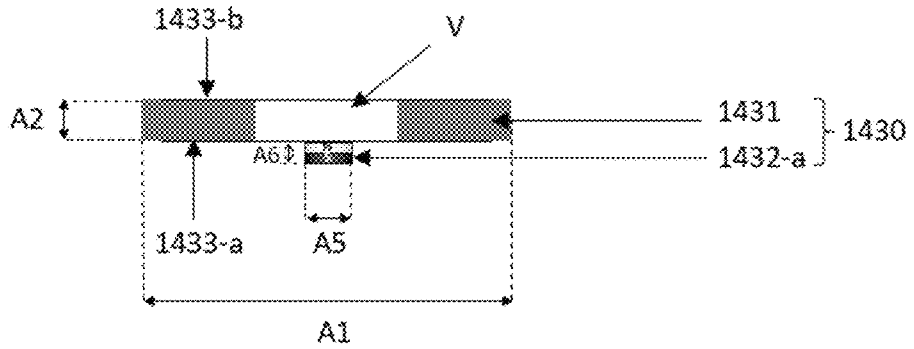

FIG. 14A-C schematically illustrates a process for producing an optical effect layer (OEL) and illustrate a top view (FIG. 14B) and a cross-section (FIG. 14C) of a magnetic assembly (1430) used to produce said OEL, said process comprising the use of i) a magnetic assembly (1430) so as to orient at least a part of platelet-shaped magnetic or magnetizable pigment particles of a coating layer (1410) made of a coating composition comprising said platelet-shaped magnetic or magnetizable pigment particles, wherein the magnetic assembly (1430) comprises i) a soft magnetic plate (1431) comprising a loop-shaped, in particular a circle-shaped, void (V) having a depth of 100% and ii) a dipole magnet (1432-*a*) having its magnetic axis substantially perpendicular to the soft magnetic plate (1431) surface and substantially perpendicular to the substrate (1420) surface, wherein said dipole magnet (1432-*a*) symmetrically faces the loop-shaped void (V).

Figure 14D:
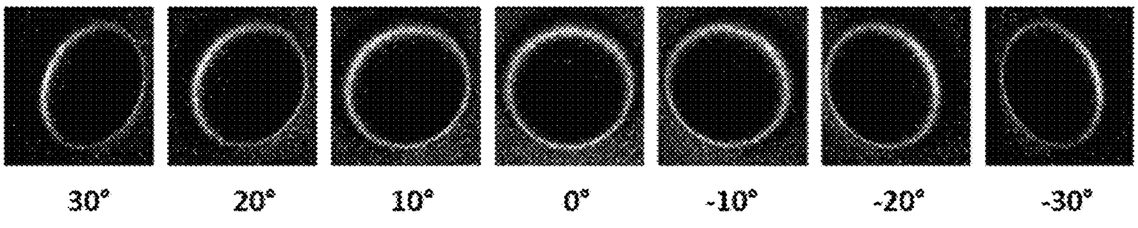

FIG. 14D shows photographic images of an OEL, said OEL being obtained by using process and the magnetic assembly shown in FIG. 14A-C.

Figure 15A:
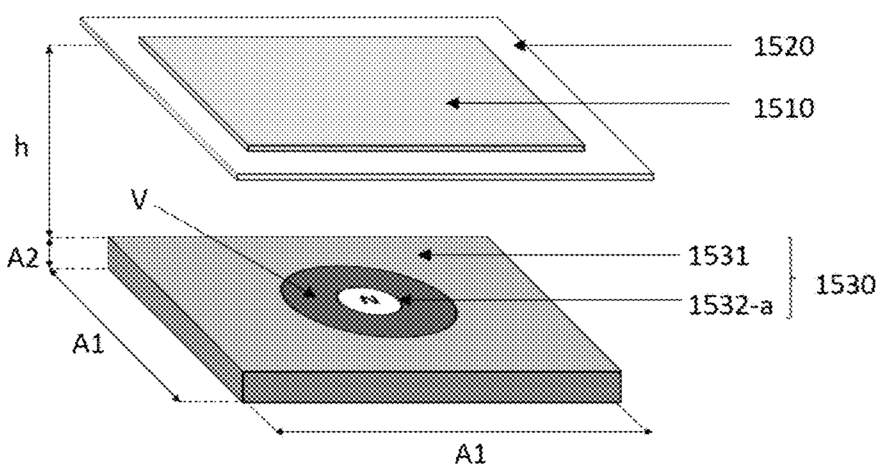
Figure 15B:
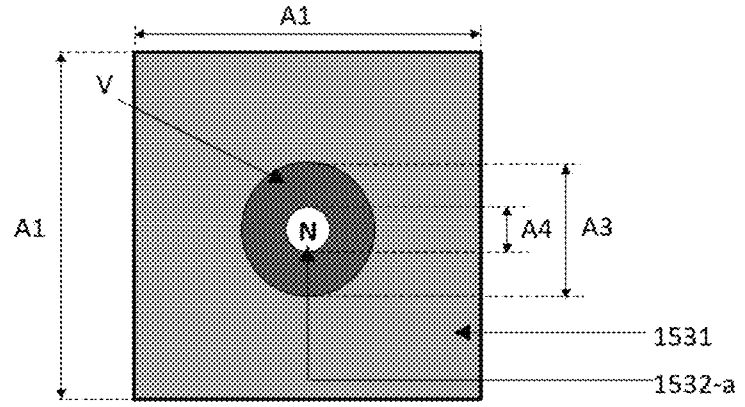
Figure 15C:
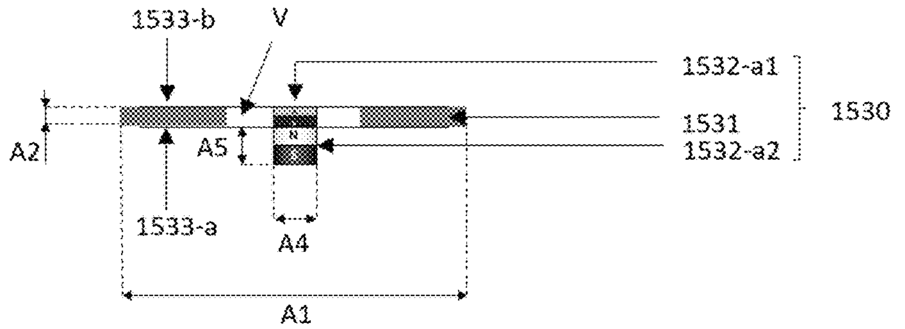

FIG. 15A-C schematically illustrates a process for producing an optical effect layer (OEL) and illustrate a top view (FIG. 15B) and a cross-section (FIG. 15C) of a magnetic assembly (1530) used to produce said OEL, said process comprising the use of i) a magnetic assembly (1530) so as to orient at least a part of platelet-shaped magnetic or magnetizable pigment particles of a coating layer (1510) made of a coating composition comprising said platelet-shaped magnetic or magnetizable pigment particles, wherein the magnetic assembly (1530) comprises i) a soft magnetic plate (1531) comprising a loop-shaped, in particular a circular-shaped, void (V) having a depth of 100% and ii) two dipole magnets (1532-*a*1, 1532*a*-*a*2) having their magnetic axis substantially perpendicular to the soft magnetic plate (1531) surface and substantially perpendicular to the substrate (1520) surface and having the same magnetic direction, wherein the first dipole magnet (1532-*a*1) is disposed symmetrically within the loop-shaped void (V) and the second dipole magnet (1532-*a*2) is placed below the first dipole magnet (1532-*a*1), below the soft magnetic plate (1531) and symmetrically faces the loop-shaped void (V).

Figure 15D:
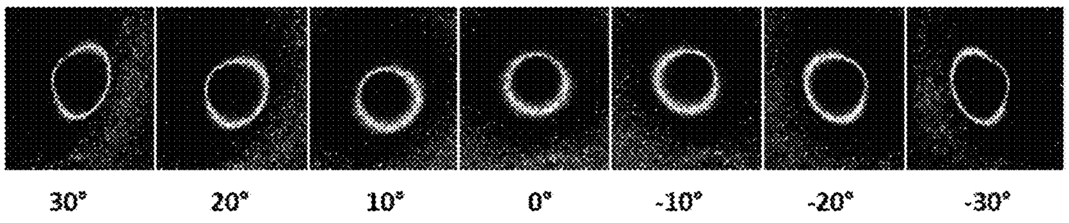

FIG. 15D shows photographic images of an OEL, said OEL being obtained by using the process and the magnetic assembly shown in FIG. 15A-C.

Figure 16A:
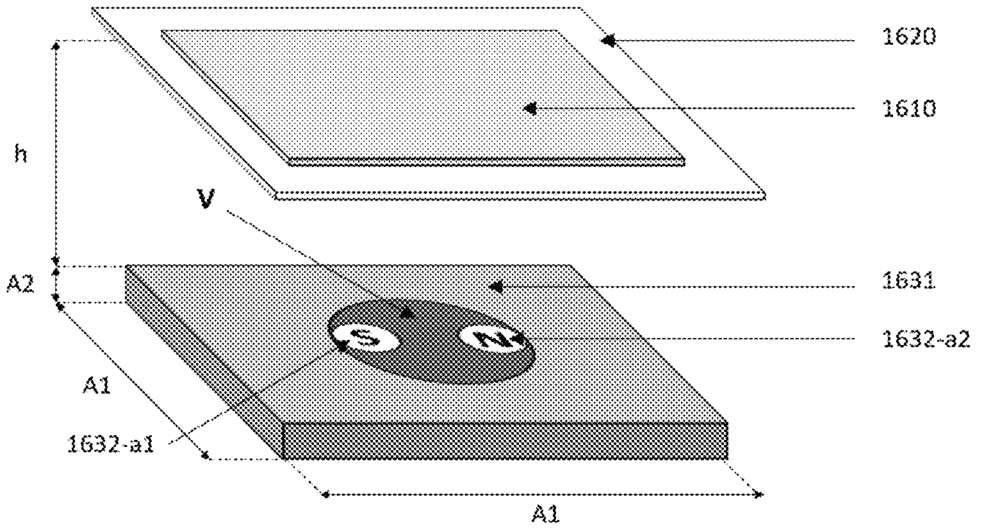
Figure 16B:
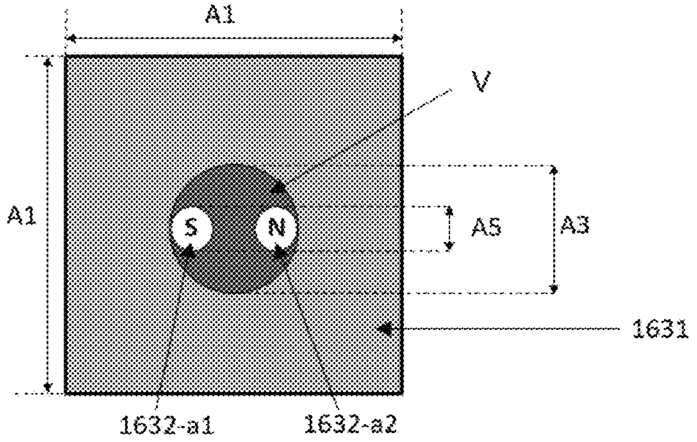
Figure 16C:
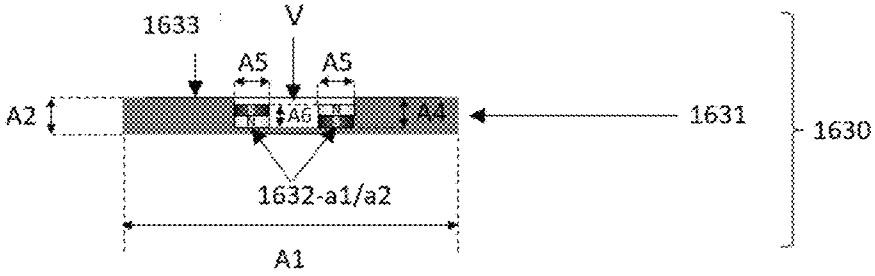

FIG. 16A-C schematically illustrates a process for producing an optical effect layer (OEL) and illustrate a top view (FIG. 16B) and a cross-section (FIG. 16C) of a magnetic assembly (1630) used to produce said OEL, said process comprising the use of i) a magnetic assembly (1630) so as to orient at least a part of platelet-shaped magnetic or magnetizable pigment particles of a coating layer (1610) made of a coating composition comprising said platelet-shaped magnetic or magnetizable pigment particles, wherein the magnetic assembly (1630) comprises i) a soft magnetic plate (1631) comprising a loop-shaped, in particular a circular-shaped, void (V) having a depth of less than 100% and ii) two dipole magnets (1632-*a*1, 1632*a*-*a*2) having their magnetic axis substantially perpendicular to the soft magnetic plate (1631) surface and substantially perpendicular to the substrate (1620) surface and having an opposite magnetic direction, wherein the two dipole magnets (1632-*a*1, 1632-*a*2) are disposed within the loop-shaped void (V) and are spaced apart.

Figure 16D:
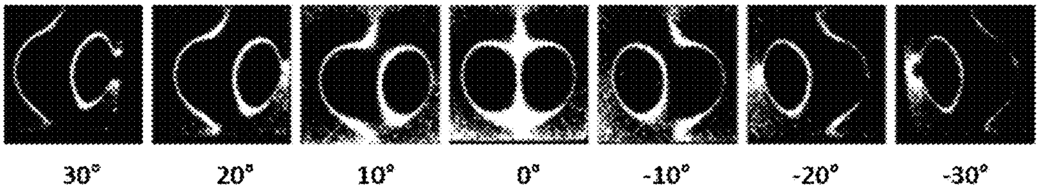

FIG. 16D shows photographic images of an OEL, said OEL being obtained by using the process and the magnetic assembly shown in FIG. 16A-C.

Figure 17A:
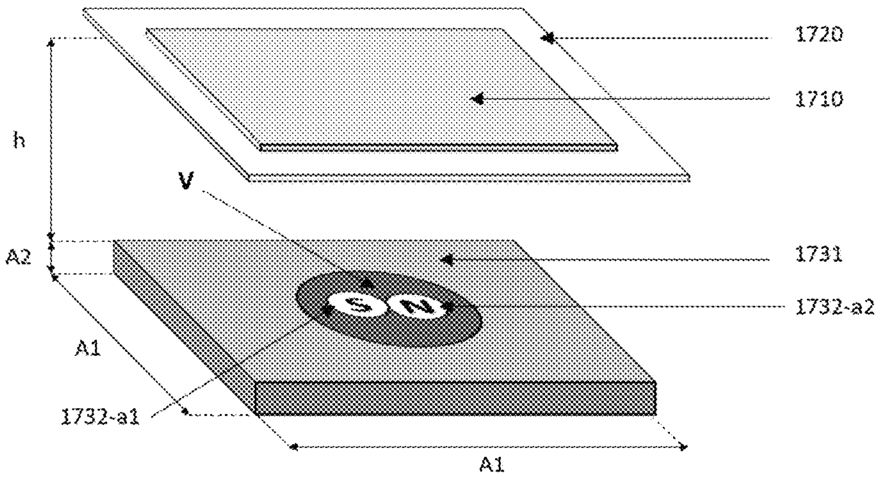
Figure 17B:
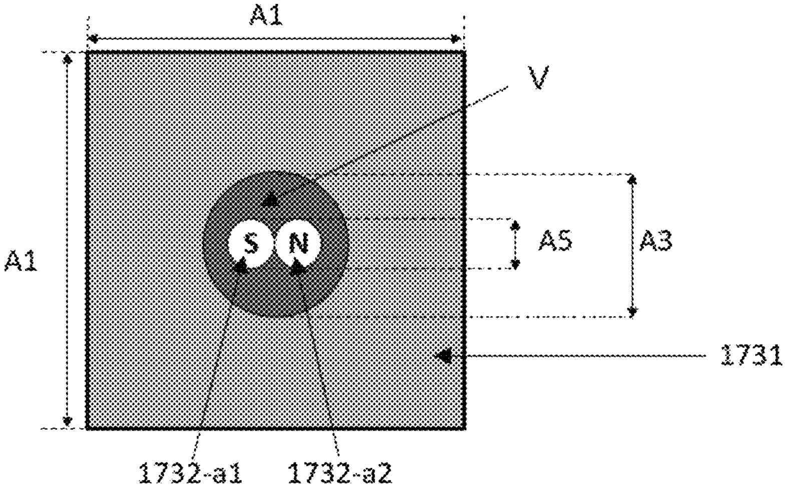
Figure 17C:
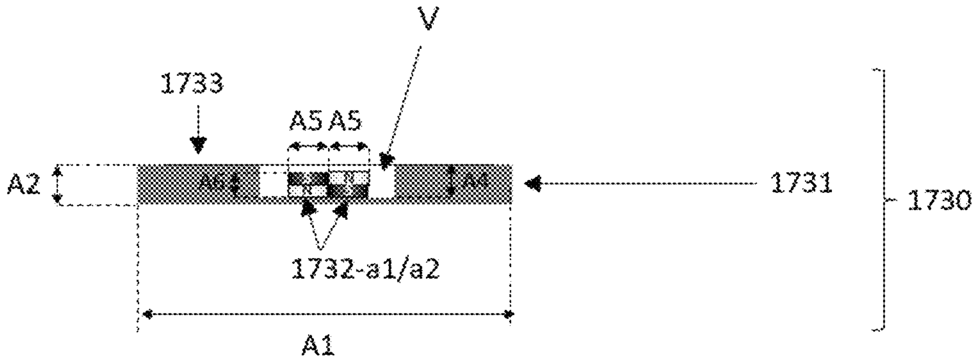

FIG. 17A-C schematically illustrates a process for producing an optical effect layer (OEL) and illustrate a top view (FIG. 17B) and a cross-section (FIG. 17C) of a magnetic assembly (1730) used to produce said OEL, said process comprising the use of i) a magnetic assembly (1730) so as to orient at least a part of platelet-shaped magnetic or magnetizable pigment particles of a coating layer (1710) made of a coating composition comprising said platelet-shaped magnetic or magnetizable pigment particles, wherein the magnetic assembly (1730) comprises i) a soft magnetic plate (1731) comprising a loop-shaped, in particular a circular-shaped, void (V) having a depth of less than 100% and ii) two dipole magnets (1732-*a*1, 1732*a*-*a*2) having their magnetic axis substantially perpendicular to the soft magnetic plate (1731) surface and substantially perpendicular to the substrate (1720) surface and having an opposite magnetic direction, wherein the two dipole magnets (1732-*a*1, 1732-*a*2) are disposed within the loop-shaped void (V) and are spaced apart.

Figure 17D:
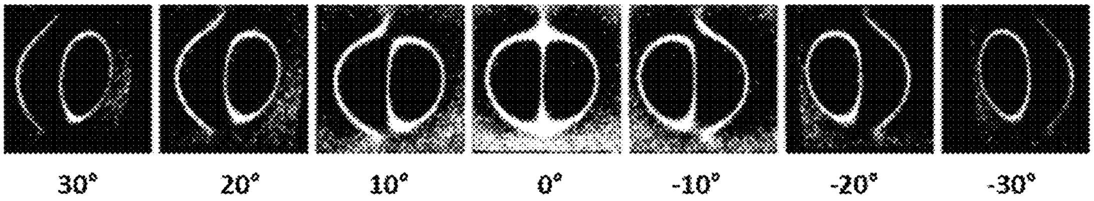

FIG. 17D shows photographic images of an OEL, said OEL being obtained by using the process and the magnetic assembly shown in FIG. 17A-C.

DETAILED DESCRIPTION

Definitions

The following definitions are to be used to interpret the meaning of the terms discussed in the description and recited in the claims.

As used herein, the indefinite article "a" indicates one as well as more than one and does not necessarily limit its referent noun to the singular.

As used herein, the term "at least" is meant to define one or more than one, for example one or two or three.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "optical effect layer (OEL)" as used herein denotes a coating or layer that comprises oriented platelet-shaped magnetic or magnetizable pigment particles and a binder, wherein said platelet-shaped magnetic or magnetizable pigment particles are oriented by a magnetic field and wherein the oriented platelet-shaped magnetic or magnetizable pigment particles are fixed/frozen in their orientation and position (i.e. after hardening/curing) so as to form a magnetically induced image.

The term "magnetic axis" denotes a theoretical line connecting the corresponding North and South Poles of a magnet and extending through said poles. This term does not include any specific magnetic direction.

The term "magnetic direction" denotes the direction of the magnetic field vector along a magnetic field line pointing from the North Pole at the exterior of a magnet to the South Pole (see Handbook of Physics, Springer 2002, pages 463-464).

The term "coating composition" refers to any composition which is capable of forming an optical effect layer (EOL) on a solid substrate and which can be applied preferably but not exclusively by a printing method. The coating composition comprises the platelet-shaped magnetic or magnetizable pigment particles described herein and the binder described herein.

As used herein, the term "wet" refers to a coating layer which is not yet cured, for example a coating in which the platelet-shaped magnetic or magnetizable pigment particles are still able to change their positions and orientations under the influence of external forces acting upon them.

As used herein, the term "indicia" shall mean discontinuous layers such as patterns, including without limitation symbols, alphanumeric symbols, motifs, letters, words, numbers, logos and drawings.

The term "hardening" is used to denote a process wherein the viscosity of a coating composition in a first physical state which is not yet hardened (i.e. wet) is increased so as to convert it into a second physical state, i.e. a hardened or solid state, where the platelet-shaped magnetic or magnetizable pigment particles are fixed/frozen in their current positions and orientations and can no longer move nor rotate.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The present invention provides magnetic assemblies (x30) and processes for producing optical effect layers (OELs). The so-obtained optical effect layers (OELs) provides the impression of one or more bodies having a shape that varies upon tilting the optical effect layer and/or moving upon tilting the optical effect layer.

According to one embodiment, the present invention provides magnetic assemblies (x30) and processes for producing optical effect layers (OEL) exhibiting one or more indicia. The optical effect layer (OEL) exhibiting one or more indicia, refers to a layer wherein the orientation of the platelet-shaped magnetic or magnetizable pigment particles described herein within the OEL allows the observation of said one or more indicia. The indicia may have any forms including without limitation symbols, alphanumeric symbols, motifs, letters, words, numbers, logos and drawings. The one or more indicia may have a round, oval, ellipsoid, triangular, a square, rectangular or any polygonal shape. Examples of shapes include a ring or circle, a rectangle or square (with or without rounded corners), a triangle (with or without rounded corners), a (regular or irregular) pentagon (with or without rounded corners), a (regular or irregular) hexagon (with or without rounded corners), a (regular or irregular) heptagon (with or without rounded corners), an (regular or irregular) octagon (with or without rounded corners), any polygonal shape (with or without rounded corners), a heart, a star, a moon, etc.

The present invention provides a process for producing an optical effect layer (OEL), in particular an optical effect layer (OEL) exhibiting one or more indicia, into a not yet hardened (i.e. wet or liquid) coating layer made of a coating composition comprising platelet-shaped magnetic or magnetizable pigment particles and a binder material on a substrate (x20) through the magnetic orientation of said pigment particles by exposing the coating layer (x10) to the magnetic field of the magnetic assembly (x30) described herein.

The magnetic assemblies (x30) described herein are mounted on the transferring device (TD) described herein and comprises i) the soft magnetic plate (x31) made of the composite described herein and comprising the one or more voids (V) described herein, and ii) the one or more dipole magnets (x32-*a*) described herein, and being disposed within the one or more voids (V) and/or facing said one or more voids (V), and/or the one or more pairs of two dipole magnets (x32-*b*) described herein and being disposed below the soft magnetic plate (x31) and being spaced apart from the one or more voids (V).

The present invention further provides the transferring device (TD) described herein and printing apparatuses comprises the transferring device (TD) described herein. The transferring device (TD) described herein comprises at least one of the magnetic assemblies (x30) described herein, wherein said at least one of the magnetic assemblies (x30) described herein is mounted on said transferring device (TD) described herein. The transferring device (TD) described herein may be a rotating magnetic orienting cylinder (RMC) or a linear magnetic transferring device (LMTD) such as for example a linear guide. Preferably, the transferring device (TD) described herein is a rotating magnetic orienting cylinder (RMC). Preferably, the transferring device (TD) is rotating magnetic cylinder (RMC), wherein said at least one of the magnetic assemblies (x30) described herein is mounted on circumferential grooves or transverse grooves of the rotating magnetic cylinder (RMC). In an embodiment, the rotating magnetic cylinder (RMC) is part of a rotary, sheet-fed or web-fed industrial printing press that operates at high printing speed in a continuous way.

The transferring device (TD), preferably the rotating magnetic cylinder (RMC), comprising at least one of the magnetic assemblies (x30) described herein mounted thereon are meant to be used in, or in conjunction with, or being part of a printing or coating equipment. In an embodiment, the transferring device (TD) is a rotating magnetic cylinder (RMC) such as those described herein.

The printing apparatuses comprising the transferring device (TD) described herein, preferably the rotating magnetic cylinder (RMC) described herein, and comprising at least one of the magnetic assemblies (x30) described herein may include a substrate feeder for feeding a substrate such as those described herein. In an embodiment of the printing apparatuses comprising the transferring device (TD) described herein, preferably the rotating magnetic cylinder (RMC) described herein, the substrate is fed by the substrate feeder under the form of sheets or a web.

The printing apparatuses comprising the transferring device (TD) described herein, preferably the rotating magnetic cylinder (RMC) described herein, and comprising at least one of magnetic assemblies (x30) described herein described herein may include a substrate-guiding system. As used herein, a "substrate-guiding system" refers to a set-up that holds the substrate (x10) carrying the coating layer (x10) in close contact with the transferring device (TD) described herein, preferably the rotating magnetic cylinder (RMC) described herein. The substrate-guiding system may be a gripper and/or a vacuum system. Particularly, the gripper may serve the purpose of holding the leading edge of the substrate (x10) and allowing the (x10) to be transferred from one part of the printing machine to the next, and the vacuum system may serve to pull the surface of the (x10) against the surface of the transferring device (TD) described herein, preferably the rotating magnetic cylinder (RMC) described herein and maintain it firmly aligned therewith. The substrate-guiding system may comprise, in addition to or instead of the gripper and/or the vacuum system other pieces of substrate-guiding equipment including without limitation a roller or a set of rollers, a brush or a set of brushes, a belt and/or a set of belts, a blade or a set of blades, or a spring or a set of springs.

The printing apparatuses comprising the transferring device (TD) described herein, preferably the rotating magnetic cylinder (RMC) described herein, and comprising at least one of the magnetic assemblies (x30) described herein may include a coating or printing unit for applying the coating composition comprising the platelet-shaped magnetic or magnetizable pigment particles described herein on the substrate (x10) described herein so as to form the coating layer (x20) described herein.

The printing apparatuses comprising the transferring device (TD) described herein, preferably the rotating magnetic cylinder (RMC) described herein, and comprising at least one of the magnetic assemblies (x30) described herein may include a hardening unit (x50), preferably a curing unit, for at least partially hardening the coating layer (x20) comprising platelet-shaped magnetic or magnetizable pigment particles that have been magnetically oriented by the magnetic field the magnetic assemblies (x30) described herein, thereby fixing the orientation and position of the platelet-shaped magnetic or magnetizable pigment particles to produce an optical effect layer (OEL).

The soft magnetic plate (x31) described herein is characterized by a top surface, wherein said top surface consists of the surface onto which a substrate (x20) carrying a coating layer (x10) will be placed in direct contact or in indirect contact. As shown for example in FIGS. 3A and 4A, the top surface (dotted line) of a soft magnetic plate (x31) comprising the one or more voids (V) described herein consists of the top surface of the plate itself. Alternatively and when the soft magnetic plate (x31) described herein comprises a non-magnetic holder or spacer (x33) such as those described hereafter on its top surface and covering the one or more voids (V) described herein, the top surface of said soft magnetic plate (x31) is considered to be the top surface of said non-magnetic holder or spacer (x33).

The soft magnetic plate (x31) comprises the one or more voids (V) described herein. When more than one voids (V) are comprised in the soft magnetic plate (x31) described herein, said voids (V) may have a same shape or may have a different shape.

Figure 1:
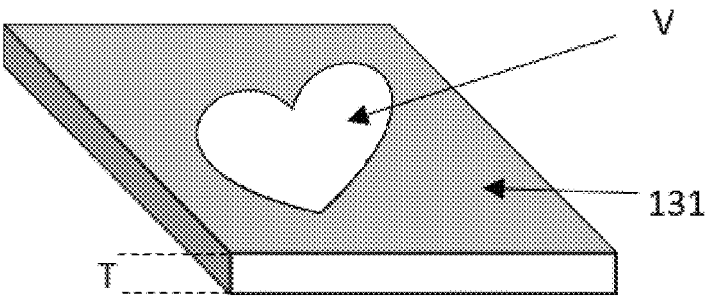

FIG. 1 schematically depict views of a soft magnetic plate (131) having a thickness (T) and comprising a void (V), in a particular a loop-shaped void (V) (a heart). The term "void" means, in the context of the present invention, a recess in the soft magnetic plate (see FIG. 2A) or a hole or channel which goes through the soft magnetic plate (see FIG. 2B) and connects both sides thereof.

Figure 2A:
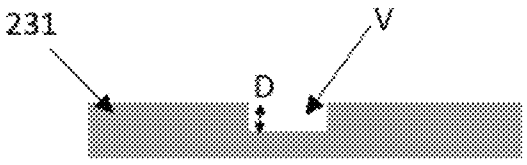
FIG. 2A-B schematically illustrate cross-sections of a soft magnetic plate (231) comprising a void (V) having a depth (D) less than 100% (FIG. 2A) or a depth having of 100% (FIG. 2B).
Figure 2B:
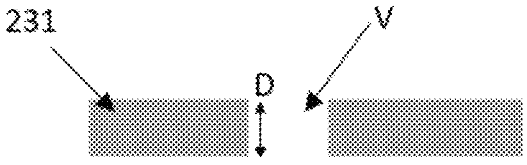

FIG. 2A-B schematically depict cross sections of a soft magnetic plate (231) comprising a void (V), wherein said void (V) has a depth (D). According to one embodiment and as shown for example in FIG. 2A, the soft magnetic plate (231) described herein comprises the one or more voids (V) having a depth of less than 100%, i.e. the one or more voids (V) are in the form of recesses. According to another embodiment and as shown for example in FIG. 2B, the soft magnetic plate (231) described herein comprises the one or more voids (V) having a depth of 100%, i.e. the one or more voids (V) are in the form of holes or channels which go through the soft magnetic plate (231) and connect both sides thereof.

The soft magnetic plates (x31) described herein are made of a composite comprising from about 25 wt-% to about 95 wt-%, preferably from about 50 wt-% to about 90 wt-%, of spherical soft magnetic particles dispersed in a non-magnetic material, the weight percents being based on the total weight of the one or more soft magnetic plates.

The spherical soft magnetic particles described herein are made of one or more soft magnetic materials preferably selected from the group consisting of iron (especially iron pentacarbonyl, also called carbonyl iron), nickel (especially nickel tetracarbonyl, also called carbonyl nickel), cobalt, soft magnetic ferrites (e.g. manganese-zinc ferrites and nickel-zinc ferrites), soft magnetic oxides (e.g. oxides of manganese, iron, cobalt and nickel) and combinations thereof, more preferably selected from the group consisting of carbonyl iron, carbonyl nickel, cobalt and combinations thereof.

The spherical soft magnetic particles described herein preferably have an average particle size ($d_{50}$) between about 0.1 μm and about 1000 μm, more preferably between about 0.5 μm and about 100 μm, still more preferably between about 1 μm and 20 about μm, and even more preferably between 2 about μm and 10 about μm, $d_{50}$ being measured by laser diffraction using for example a microtrac X100 laser particle size analyzer.

The soft magnetic plates (x31) described herein are made of the composite described herein, wherein said composite comprises the spherical soft magnetic particles described herein dispersed in a non-magnetic material. Suitable non-magnetic materials include without limitation polymeric materials forming a matrix for the dispersed soft magnetic particles. The polymeric matrix-forming materials may be one or more thermoplastic materials or one or more thermosetting materials or comprise one or more thermoplastic materials or one or more thermosetting materials. Suitable thermoplastic materials include without limitation polyamides, co-polyamides, polyphtalimides, polyolefins, polyesters, polytetrafluoroethylenes, polyacrylates, polymethacrylates (e.g. PMMA), polyim ides, polyetherim ides, polyetheretherketones, polyaryletherketones, polyphenylene sulfides, liquid crystal polymers, polycarbonates and mixtures thereof. Suitable thermosetting materials include without limitation epoxy resins, phenolic resins, polyimide resins, polyester resins, silicon resins and mixtures thereof. The one or more soft magnetic plates (x31) described herein are made of a composite comprising from about 5 wt-% to about 75 wt-%, preferably from about 10 wt-% to about 50 wt-%, of the non-magnetic material described herein, the weight percents being based on the total weight of the one or more soft magnetic plates.

The soft magnetic plates (x31) described herein described herein may further comprise one or more additives such as for example hardeners, dispersants, plasticizers, fillers/extenders and defoamers.

The one or more soft magnetic plate (x31) described herein have preferably a thickness of at least about 0.5 mm, more preferably at least about 1 mm and still more preferably between about 1 mm and about 5 mm. As described hereabove and as shown in FIG. 1, the thickness (T) of the soft magnetic plate (x31) comprising the one or more voids described herein refers to the thickness of the regions of the soft magnetic plate (x31) lacking the one or more voids (V).

The soft magnetic plate (x31) described herein may additionally be surface-treated for facilitating contact with the substrate (x20) carrying the coating layer (x10) described herein, reducing friction and/or wear and/or electrostatic charging in a high-speed printing applications.

According to a preferred embodiment, the soft magnetic plate (x31) described herein is curved so as to be adaptable in or on the rotating magnetic cylinder (RMC) described herein. Preferably, the soft magnetic plate (x31) has a curved surface have a substantially similar curvature as the outer surface of the rotating magnetic cylinder described herein so that the surface of the substrate (x20) comprising the coating layer (x10) comprising the platelet-shaped magnetic or magnetizable pigment particles described herein is not negatively affected.

The one or more voids (V) described herein of the soft magnetic plate (x31) described herein are designed to either receive the one or more dipole magnets (x32-*a*) described herein, i.e. they allow the incorporation of the one or more dipole magnets (x32-*a*) described herein in said soft magnetic plate (x31) or they allow the incorporation of the one or more dipole magnets (x32-*a*) described herein below said soft magnetic plate (x31) and facing the one or more voids (V) of said soft magnetic plate (x31).

Preferably, the one or more voids (V) described herein have the shape of an indicium including without limitation symbols, alphanumeric symbols, motifs, letters, words, numbers, logos and drawings. The one or more voids (V) may have a round, oval, ellipsoid, triangular, a square, rectangular or any polygonal shape. Examples of shapes include a ring or circle, a rectangle or square (with or without rounded corners), a triangle (with or without rounded corners), a (regular or irregular) pentagon (with or without rounded corners), a (regular or irregular) hexagon (with or without rounded corners), a (regular or irregular) heptagon (with or without rounded corners), an (regular or irregular) octagon (with or without rounded corners), any polygonal shape (with or without rounded corners), a heart, a star, a moon, etc.

According to one embodiment, the soft magnetic plate (x31) described herein comprises the one or more voids (V) described herein, wherein said one or more voids (V), in particular voids having a depth of 100%, may be filled up with a non-magnetic material including a polymeric binder such as those described hereafter and optionally fillers. The soft magnetic plate (x31) described herein comprising the one or more voids (V) described herein may be arranged on a non-magnetic holder or spacer (x33), for instance a non-magnetic metal plate, may be made of one the polymeric matrix materials described herein. Typically, said non-magnetic holder or spacer (x33), for instance a non-magnetic metal plate, may be made of one of the polymeric matrix materials described herein. For example, a soft magnetic plate (x31) comprising the one or more voids (V) described herein and having a depth of 100% may be arranged on said non-magnetic holder or spacer (x33). The one or more voids (V) described herein may be covered by a non-magnetic holder or spacer (x33) such as those described above.

The one or more voids (V) of the soft magnetic plate (x31) described herein may be produced by any cutting or engraving methods known in the art including without limitation casting, molding, hand-engraving or ablation tools selected from the group consisting of mechanical ablation tools, gaseous or liquid jet ablation tools, by chemical etching, electro-chemical etching and laser ablation tools (e.g. $CO^{2-}$, Nd-YAG or excimer lasers). Preferably, the one or more voids (V) of the soft magnetic plate (x31) described herein are produced and treated like any other polymer material. Techniques well-known in the art including 3D printing, lamination molding, compression molding, resin transfer molding or injection molding may be used. After molding, standard curing procedures may be applied, such as cooling down (when thermoplastic polymers are used) or curing at high or low temperature (when thermosetting polymers are used). Another way to obtain the one or more soft magnetic composite plates (x31) described herein is to remove parts of them to get the required voids using standard tools to work out plastic parts. Especially, mechanical ablation tools may be advantageously used.

The distance (h) between the top surface of the soft magnetic plate (x31) of the magnetic assembly (x30) described herein and the substrate (x20) carrying the coating layer (x10) is adjusted and selected to obtain the desired optical effect layers (OELs). It is particularly preferred to use a distance between the top surface of the soft magnetic plate (x31) and the substrate (x20) close to zero or being zero.

During the production of the optical effect layers (OELs) described herein, the substrate (x20) carrying the coating layer (x10) is exposed to the magnetic field of the magnetic assembly (x30) described herein so that the platelet-shaped magnetic or magnetizable pigment particles are oriented while the coating layer/composition is still in a wet (i.e. not yet hardened) state.

In addition to the soft magnetic plate (x31) described herein, the magnetic assembly (x30) described herein comprises the one or more dipole magnets (x32-*a*) described herein and/or the one or more pairs of two dipole magnets (x32-*b*) described herein.

The one or more dipole magnets (x32-*a*) and the two dipole magnets (x32-*b*) of the one or more pairs described herein are preferably independently made of high-coercivity materials (also referred as strong magnetic materials). Suitable high-coercivity materials are materials having a coercivity field value of at least 50 kA/m, preferably at least 200 kA/m, more preferably at least 1000 kA/m, even more preferably at least 1700 kA/m. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula $MFe_{12}O_{19}$, (e.g. strontium hexaferrite ($SrO*6Fe_2O_3$) or barium hexaferrites ($BaO*6Fe_2O_3$)), hard ferrites of the formula $MFe_20_4$ (e.g. as cobalt ferrite ($CoFe_20_4$) or magnetite ($Fe_3O_4$)), wherein M is a bivalent metal ion), ceramic 8 (SI-1-5); rare earth magnetic materials selected from the group comprising $RECo_5$ (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the one or more dipole magnets (x32-*a*) described herein and the two dipole magnets (x32-*b*) of the one or more pairs described herein are independently selected from the groups consisting of rare earth magnetic materials, and more preferably from the group consisting of $Nd_2Fe_{14}B$ and $SmCo_5$. Particularly preferred are easily workable permanent-magnetic composite materials that comprise a permanent-magnetic filler, such as strontium-hexaferrite ($SrFe_{12}O_{19}$) or neodymium-iron-boron ($Nd_2Fe_{14}B$) powder, in a plastic- or rubber-type matrix.

Figure 3A:
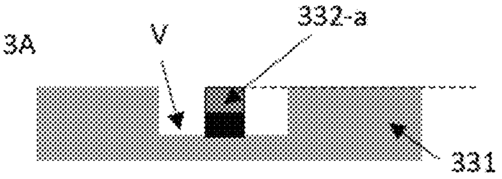
FIG. 3A-D schematically illustrate cross-sections of a soft magnetic plate (331) comprising a void (V) having a depth of less than 100% and a) one dipole magnet (332-*a*) disposed within the void (V) (FIG. 3A-3B) or one dipole magnet (332-*a*) facing the void (V) (FIG. 3C), wherein the dipole magnet (332-*a*) has its magnetic axis substantially perpendicular to the soft magnetic plate (331) or b) two dipole magnets (332-*a*), wherein one of said dipole magnets (332-*a*) is disposed within the void (V) and another one of said dipole magnets (332-*a*) faces the void (V) and wherein both dipole magnets (332-*a*) have their magnetic axis substantially perpendicular to the soft magnetic plate (331).
Figure 3B:
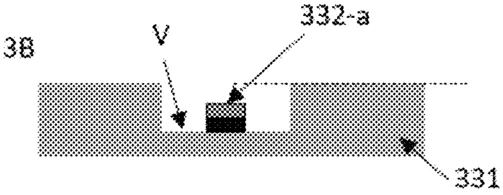
Figure 3C:
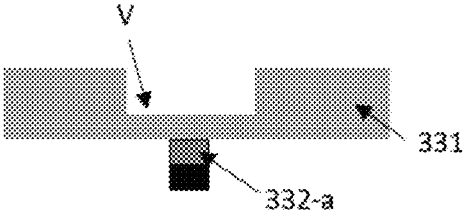
Figure 4A:
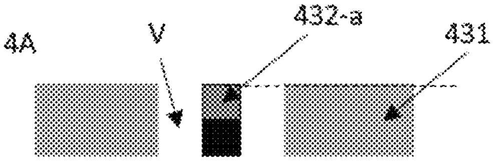
FIG. 4A-D schematically illustrate cross-sections of a soft magnetic plate (431) comprising a void (V) having a depth of 100% and a) one dipole magnet (432-*a*) disposed within the void (V) (FIG. 4A-4B) or facing the void (V) (FIG. 4C), wherein the dipole magnet (432-*a*) has its magnetic axis substantially perpendicular to the soft magnetic plate (431), or b) two dipole magnets (432-*a*), wherein one of said dipole magnets (432-*a*) is disposed within the void (V) and another one of said dipole magnets (432-*a*) faces the void (V) and wherein both dipole magnets (432-*a*) have their magnetic axis substantially perpendicular to the soft magnetic plate (431).
Figure 4B:
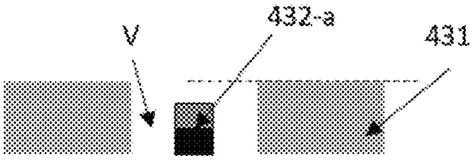
Figure 4C:
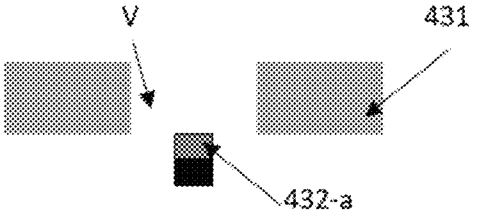

The one or more dipole magnets (x32-*a*) described herein are disposed within the one or more voids (V) (see for example FIGS. 3A, 3B, 4A, and 4B) or are facing said one or more voids (V) (see for example FIGS. 3C and 4C). The one or more dipole magnets (x32-*a*) described herein may disposed symmetrically or non-symmetrically within the one or more voids (V) described herein and may symmetrically or non-symmetrically face said one or more voids (V).

Figure 3D:
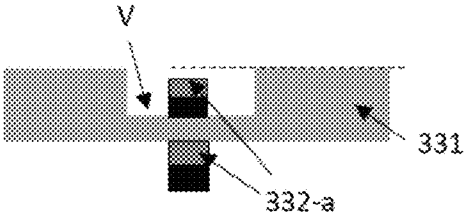
Figure 4D:
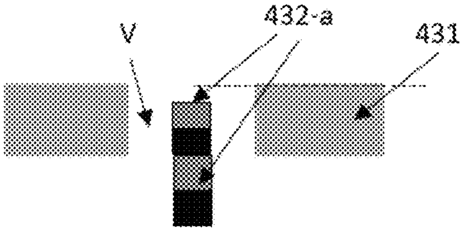

When more than one dipole magnets (x32-*a*) are used instead of one dipole magnet (x32-*a*), said more than one dipole magnets (x32-*a*) may be all disposed within the one or more voids (V), may be all disposed to face the one or more voids (V), or at least one of said more than one dipole magnets (x32-*a*) may be disposed within the one or more voids (V) and at least another one may be disposed to face the one or more voids (V) (see for example FIGS. 3D and 4D).

When more than one dipole magnets (x32-*a*) are used instead of one dipole magnet (x32-*a*), said more than one dipole magnets (x32-*a*) are preferably placed on top of each other. The shape of said more than one dipole magnets (x32-*a*) may be the same or may be different. The size of the top surface (diameter in case of a cylindrical dipole magnet) of said more than one dipole magnets (x32-*a*) may be the same or may be different. The thickness of said more than one dipole magnets (x32-*a*) may be the same or may be different.

According to one embodiment, the magnetic assemblies (x30) described herein comprise a soft magnetic plate (x31) which comprises the one or more voids (V) having a depth of less than 100% such as those described herein and comprises more than one dipole magnets (x32-*a*), wherein said more than one dipole magnets (x32-*a*) are placed on top of each other and are separated by the soft magnetic plate (x31) in the region(s) of the one or more voids (V), i.e. one of said dipole magnets (x32-*a*) is disposed within the one or more voids (V) and at least another said dipole magnets (x32-*a*) is disposed to face the one or more voids (V) (see for example FIG. 3D). According to another embodiment, the soft magnetic plate (x31) comprises the one or more voids (V) having a depth of 100% and comprises more than one dipole magnets (x32-*a*), wherein said more than one dipole magnets (x32-*a*) are placed on top of each other, i.e. one of said dipole magnets (x32-*a*) is disposed within the one or more voids (V) and at least another one of said dipole magnets (x32-*a*) is disposed below the soft magnetic plate (x31) and faces the one or more voids (V) (see for example FIG. 4D).

Figure 3E:
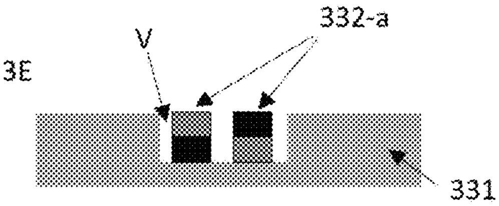
FIG. 3E-F schematically illustrate cross-sections of a soft magnetic plate (331) comprising a void (V) having a depth of less than 100% and two dipole magnets (332-*a*) disposed within the void (V), wherein the dipole magnets (332-*a*) have their magnetic axis substantially perpendicular to the soft magnetic plate (331) and wherein both dipole magnets (332-*a*) have an opposite magnetic direction. The two dipole magnets (332-*a*) are adjacent (see FIG. 3F) to each other or are laterally spaced apart (see FIG. 3F).
Figure 3F:
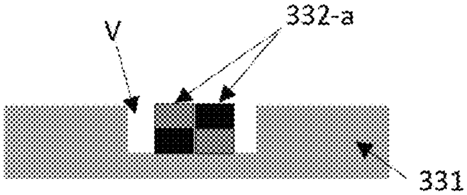

When more than one dipole magnets (x32-*a*) are used instead of one dipole magnet (x32-*a*), said more than one dipole magnets (x32-*a*) may be placed on top of each other (see for example FIGS. 3D and 4D) or may be placed aside each other (see FIGS. 3E and 3F). The more than one dipole magnets (x32-*a*) described herein are preferably all disposed within a single void (V) such as those described herein, or all disposed to face the single void (V) such as those described herein, more preferably, and as shown in FIGS. 3E-F and 4D, the more than one dipole magnets (x32-*a*) described herein are preferably all disposed within a single void (V). The shape of said more than one dipole magnets (x32-*a*) may be the same or may be different. The thickness of said more than one dipole magnets (x32-*a*1, x32-*a*2, etc.) may be the same or may be different. The more than one dipole magnets (x32-*a*) described herein and disposed within the single void (V) may be placed on top of each other (see FIG. 4D). The more than one dipole magnets (x32-*a*) described herein and disposed within the single void (V) may be adjacent (see FIG. 3F) to each other or may be laterally spaced apart (see FIG. 3F), wherein said more than one dipole magnets (x32-*a*) preferably have an opposite magnetic direction.

According to one embodiment, each one of the one or more dipole magnets (x32-*a*) described herein has a magnetic axis substantially perpendicular to the substrate (x20) surface and substantially perpendicular to the soft magnetic plate (x31) surface. Preferably, all of said one or more dipole magnets (x32-*a*) have a same magnetic direction.

The two dipole magnets (x32-*b*) of the one or more pairs described herein are disposed below the soft magnetic plate (x31) and are spaced apart from the one or more voids (V) (or in other words are disposed below the soft magnetic plate (x31) at opposite sides of the one or more voids (V)). Preferably, the two dipole magnets (x32-*b*) of the one or more pairs described herein are disposed below the soft magnetic plate (x31), are spaced apart from the one or more voids (V) and have their lateral surface flush with the external surface of the one or more voids (V) (see for example FIG. 5-6).

The two dipole magnets (x32-*b*) of the one or more pairs described herein preferably have their magnetic axis substantially perpendicular to the substrate (x20) surface and substantially perpendicular to the soft magnetic plate (x31) surface either with the same magnetic direction or with an opposite magnetic direction.

According to one embodiment, the magnetic assemblies (x30) described herein comprise the one or more dipole magnets (x32-*a*) described herein. According to another embodiment, the magnetic assemblies (x30) described herein comprises the one or more pairs of two dipole magnets (x32-*b*) described herein. According to another embodiment, the magnetic assemblies (x30) described herein comprises the one or more dipole magnets (x32-*a*) described herein and the one or more pairs of two dipole magnets (x32-*b*) described herein.

For embodiments where the magnetic assembly (x30) described herein comprises the one or more dipole magnets (x32-*a*) described herein and the one or more pairs of two dipole magnets (x32-*b*) described herein, said one or more dipole magnets (x32-*a*) preferably have their magnetic axis substantially perpendicular to the substrate (x20) surface and substantially perpendicular to the soft magnetic plate (x31) surface and all of said one or more dipole magnets (x32-*a*) having a same magnetic direction, and said two dipole magnets (x32-*b*) of the one or more pairs described herein preferably have their magnetic axis substantially perpendicular to the substrate (x20) surface and substantially perpendicular to the soft magnetic plate (x31) surface either with the same magnetic direction or with an opposite magnetic direction (see FIGS. 5C-D and 6C-D).

According to one embodiment shown for example in FIG. 3A-B, the magnetic assembly (x30) described herein comprises i) the soft magnetic plate (x31) described herein comprising the one or more voids (V) having a depth of less than 100% described herein, and ii) the one or more dipole magnets (x32*a*) described herein being disposed within the one or more voids (V), all of them having their magnetic axis substantially perpendicular to the substrate (x20) surface and substantially perpendicular to the soft magnetic plate (x31) surface and having the same magnetic direction, wherein the top surface of the one or more dipole magnets (x32-*a*) is either flush with the top surface of the soft magnetic plate (x31) (see for example FIG. 3A) or is below the top surface of the soft magnetic plate (x31) (see for examples FIG. 3B).

According to one embodiment shown for example in FIG. 3C, the magnetic assembly (x30) described herein comprises i) the soft magnetic plate (x31) described herein comprising the one or more voids (V) having a depth of less than 100% described herein, and ii) the one or more dipole magnets (x32*a*) described herein facing the one or more voids (V), all of them having their magnetic axis substantially perpendicular to the substrate (x20) surface and substantially perpendicular to the soft magnetic plate (x31) surface and having the same magnetic direction, wherein the top surface of at least one of the one or more dipole magnets (x32-*a*) is flush with the bottom surface of the soft magnetic plate (x31) at the region(s) of the one or more voids (V).

According to one embodiment shown for example in FIG. 3D, the magnetic assembly (x30) described herein comprises i) the soft magnetic plate (x31) described herein comprising the one or more voids (V) having a depth of less than 100% described herein, and ii) the one or more dipole magnets (x32-*a*) disposed within the one or more voids (V) and the one or more dipole magnets (x32*a*) described herein facing the one or more voids (V), all of said magnets (x32-*a* and (x32-*b*) having their magnetic axis substantially perpendicular to the substrate (x20) surface and substantially perpendicular to the soft magnetic plate (x31) surface and having the same magnetic direction, wherein the top surface of at least one of one of said one or more dipole magnets (x32-*a*) is either flush with the top surface of the soft magnetic plate (x31) is below the top surface of the soft magnetic plate (x31) (see FIG. 3D) and the top surface of at least another one of said one or more dipole magnets (x32-*a*) is flush with the bottom surface the soft magnetic plate (x31) at the region(s) of the one or more voids (V) (see FIG. 3D).

According to one embodiment shown for example in FIG. 4A-B, the magnetic assembly (x30) described herein comprises i) the soft magnetic plate (x31) described herein comprising the one or more voids (V) having a depth of 100% described herein, and ii) the one or more dipole magnets (x32*a*) described herein being disposed within the one or more voids (V), all of them having their magnetic axis substantially perpendicular to the substrate (x20) surface and substantially perpendicular to the soft magnetic plate (x31) surface and having the same magnetic direction, wherein the top surface of the one or more dipole magnets (x32-*a*) is either flush with the top surface of the soft magnetic plate (x31) (see for example FIG. 4A) or is below the top surface of the soft magnetic plate (x31) (see for examples FIG. 4B), preferably wherein the top surface of the at least one of the one or more dipole magnets (x32-*a*) is flush with the top surface of the soft magnetic plate (x31).

According to one embodiment shown for example in FIG. 4C, the magnetic assembly (x30) described herein comprises i) the soft magnetic plate (x31) described herein comprising the one or more voids (V) having a depth of 100% described herein, and ii) the one or more dipole magnets (x32*a*) described herein facing the one or more voids (V), all of them having their magnetic axis substantially perpendicular to the substrate (x20) surface and substantially perpendicular to the soft magnetic plate (x31) surface and having the same magnetic direction, wherein the top surface of the at least one of the one or more dipole magnets (x32-*a*) is flush with the bottom surface the soft magnetic plate (x31) at the region(s) of the one or more voids (V).

According to one embodiment shown for example in FIG. 4D, the magnetic assembly (x30) described herein comprises i) the soft magnetic plate (x31) described herein comprising the one or more voids (V) having a depth of 100% described herein, and ii) the one or more dipole magnets (x32-*a*) disposed within the one or more voids (V) and the one or more dipole magnets (x32*a*) described herein facing the one or more voids (V), all of said magnets (x32-*a* and (x32-*b*) having their magnetic axis substantially perpendicular to the substrate (x20) surface and substantially perpendicular to the soft magnetic plate (x31) surface and having the same magnetic direction, wherein the top surface of at least one of one of said one or more dipole magnets (x32-*a*) is either flush with the top surface of the soft magnetic plate (x31) or is below the top surface of the soft magnetic plate (x31) (see for examples FIG. 4D), and the top surface of at least another one of said one or more dipole magnets (x32-*a*) is flush with the bottom surface the soft magnetic plate (x31) at the region(s) of the one or more voids (V) (see FIG. 4D).

Figure 5A:
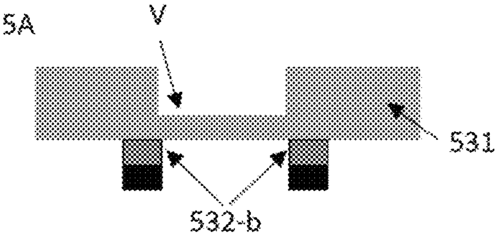
FIG. 5A-B schematically illustrate cross-sections of a soft magnetic plate (531) comprising a void (V) having a depth of less than 100% and one or more, in particular one, pairs of dipole magnets (532-*b*) disposed below the soft magnetic plate (531), wherein the two dipole magnets (532-*b*) of the pair are spaced apart from the void (V) and have a same magnetic direction (FIG. 5A) or have an opposite magnetic direction (FIG. 5B).
Figure 5B:
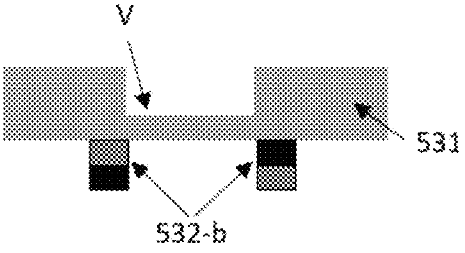

According to another embodiment shown for example in FIG. 5A-B, the magnetic assembly (x30) described herein comprises i) the soft magnetic plate (x31) described herein comprising the one or more voids (V) having a depth of less than 100% described herein, and ii) the one or more pairs of two dipole magnets (x32*b*) described herein being disposed below the soft magnetic plate (x31) and being spaced apart from the one or more voids (V), all of them having their magnetic axis substantially perpendicular to the substrate (x20) surface and substantially perpendicular to the soft magnetic plate (x31) surface and either having the same magnetic direction (FIG. 5A) or having an opposite magnetic direction (FIG. 5B), wherein the top surface of the two dipole magnets (x32-*b*) of the one or more pairs is preferably is flush with the bottom surface of the soft magnetic plate (x31) and preferably have their lateral surface flush with the external surface of the loop-shaped void (V) (see FIG. 5A-B).

Figure 6A:
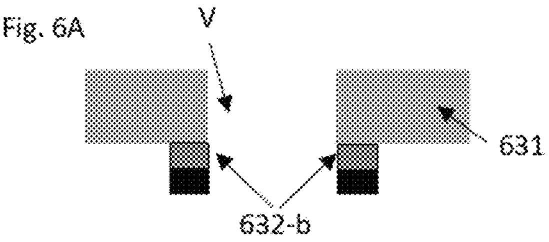
FIG. 6A-B schematically illustrate cross-sections of a soft magnetic plate (631) comprising a void (V) having a depth of 100% and one pair of dipole magnets (632-*b*) disposed below the soft magnetic plate (631), wherein the two dipole magnets (632-*b*) of the pair are and spaced apart from the void (V) and have a same magnetic direction (FIG. 6A) or have an opposite magnetic direction (FIG. 6B).
Figure 6B:
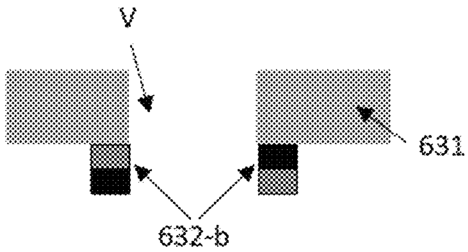

According to another embodiment shown for example in FIG. 6A-B, the magnetic assembly (x30) described herein comprises i) the soft magnetic plate (x31) described herein comprising the one or more voids (V) having a depth of 100% described herein, and ii) the one or more pairs of two dipole magnets (x32*b*) described herein being disposed below the soft magnetic plate (x31) and being spaced apart from the one or more voids (V), all of them having their magnetic axis substantially perpendicular to the substrate (x20) surface and substantially perpendicular to the soft magnetic plate (x31) surface and either having the same magnetic direction (FIG. 6A) or having an opposite magnetic direction (FIG. 6B), wherein the top surface of the two dipole magnets (x32-*b*) of the one or more pairs is preferably is flush with the bottom surface of the soft magnetic plate (x31) and preferably have their lateral surface flush with the external surface of the loop-shaped void (V) (see FIG. 6A-B).

Figure 5C:
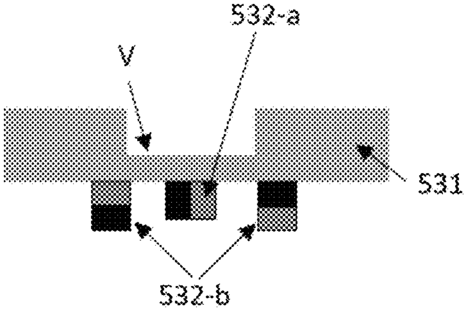
FIG. 5C-D schematically illustrate cross-sections of a soft magnetic plate (531) comprising a void (V) having a depth of less than 100%, one or more, in particular one, pairs of dipole magnets (532-*b*) disposed below the soft magnetic plate (531) and one or two dipole magnet(s) (532-*a*, 532-*a*1, 532-*a*2), wherein the dipole magnets (532-*b*) of the pair are spaced apart from the void (V) and have an opposite magnetic direction and wherein the dipole magnet (532-*a*) has its magnetic axis substantially parallel to the soft magnetic plate (531) (FIG. 5C) or wherein the two dipole magnets (532-*a*1, 532-*a*2) have their magnetic axis substantially parallel to the soft magnetic plate (531) (FIG. 5D) and have the same magnetic direction.

According to another embodiment shown for example in FIG. 5C, the magnetic assembly (x30) described herein comprises i) the soft magnetic plate (x31) described herein comprising the one or more voids (V) having a depth of less than 100% described herein, and ii) one dipole magnet (x32-*a*) being disposed to face the one or more voids (V) and having a magnetic axis substantially parallel to the substrate (x20) surface and substantially parallel to the soft magnetic plate (x31) surface and the one or more pairs of two dipole magnets (x32*b*) described herein being disposed below the soft magnetic plate (x31) and being spaced apart from the one or more voids (V), said two dipole magnets (x32-*b*) of the one or more pairs having their magnetic axis substantially perpendicular to the substrate (x20) surface and substantially perpendicular to the soft magnetic plate (x31) surface and either having the same magnetic direction or having an opposite magnetic direction (FIG. 5C), wherein the top surface of the dipole magnet (x32-*a*) and of the two dipole magnets (x32-*b*) of the one or more pairs is preferably flush with the bottom surface of the soft magnetic plate (x31) and wherein the two dipole magnets (x32-*b*) of the one or more pairs preferably have their lateral surface flush with the external surface of the loop-shaped void (V) (see FIG. 5C).

Figure 5D:
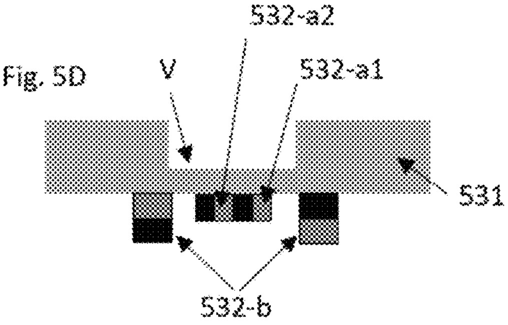

According to another embodiment shown for example in FIG. 5D, the magnetic assembly (x30) described herein comprises i) the soft magnetic plate (x31) described herein comprising the one or more voids (V) having a depth of less than 100% described herein, and ii) more than one, in particular two, dipole magnets (x32-*a*1, x32-*a*2) being disposed to face the one or more voids (V) and all of them having a magnetic axis substantially parallel to the substrate (x20) surface and substantially parallel to the soft magnetic plate (x31) surface and the one or more pairs of two dipole magnets (x32*b*) described herein being disposed below the soft magnetic plate (x31) and being spaced apart from the one or more voids (V), said two dipole magnets (x32-*b*) of the one or more pairs having their magnetic axis substantially perpendicular to the substrate (x20) surface and substantially perpendicular to the soft magnetic plate (x31) surface and either having the same magnetic direction or having an opposite magnetic direction (FIG. 5D), wherein the top surface of the more than one dipole magnets (x32-*a*1, x32-*a*2) and of the two dipole magnets (x32-*b*) of the one or more pairs is preferably is flush with the bottom surface of the soft magnetic plate (x31) and wherein the two dipole magnets (x32-*b*) of the one or more pairs preferably have their lateral surface flush with the external surface of the loop-shaped void (V) (see FIG. 5D). Preferably, the more than one dipole magnets (x32-*a*1, x32-*a*2) are laterally adjacent to each other.

Figure 6C:
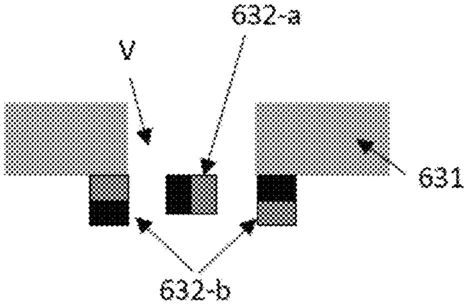
FIG. 6C-D schematically illustrate cross-sections of a soft magnetic plate (631) comprising a void (V) having a depth of 100%, one pair of dipole magnet (632-*b*) disposed below the soft magnetic plate (631) and one or two dipole magnet (632-*a*, 632-*a*1, 632-*a*2), wherein the dipole magnets (632-*b*) of the pair are spaced apart from the void (V) and have an opposite magnetic direction and wherein the dipole magnet (632-*a*) has its magnetic axis substantially parallel to the soft magnetic plate (631) (FIG. 6C) or wherein the two dipole magnets (632-*a*1, 632-*a*2) have their magnetic axis substantially parallel to the soft magnetic plate (631) (FIG. 6D).

According to another embodiment shown for example in FIG. 6C, the magnetic assembly (x30) described herein comprises i) the soft magnetic plate (x31) described herein comprising the one or more voids (V) having a depth of 100% described herein, and ii) the one or more dipole magnets (x32-*a*) being disposed to face the one or more voids (V) and having a magnetic axis substantially parallel to the substrate (x20) surface and substantially parallel to the soft magnetic plate (x31) surface and the one or more pairs of two dipole magnets (x32*b*) described herein being disposed below the soft magnetic plate (x31) and being spaced apart from the one or more voids (V), said two dipole magnets (x32-*b*) of the one or more pairs having their magnetic axis substantially perpendicular to the substrate (x20) surface and substantially perpendicular to the soft magnetic plate (x31) surface and either having the same magnetic direction or having an opposite magnetic direction (FIG. 6C), wherein the top surface of the dipole magnet (x32-*a*) is preferably is flush with the bottom surface of the soft magnetic plate (x31) at the region(s) of the one or more voids (V) and the top surface of the two dipole magnets (x32-*b*) of the one or more pairs is preferably is flush with the bottom surface of the soft magnetic plate (x31) and preferably have their lateral surface flush with the external surface of the loop-shaped void (V) (see FIG. 6C).

Figure 6D:
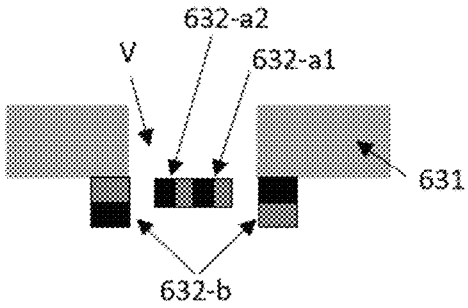

According to another embodiment shown for example in FIG. 6D, the magnetic assembly (x30) described herein comprises i) the soft magnetic plate (x31) described herein comprising the one or more voids (V) having a depth of less of 100% described herein, and ii) more than one, in particular two, dipole magnets (x32-*a*1, x32-*a*2) being disposed to face the one or more voids (V) and all of them having a magnetic axis substantially parallel to the substrate (x20) surface and substantially parallel to the soft magnetic plate (x31) surface and the one or more pairs of two dipole magnets (x32*b*) described herein being disposed below the soft magnetic plate (x31) and being spaced apart from the one or more voids (V), said two dipole magnets (x32-*b*) of the one or more pairs having their magnetic axis substantially perpendicular to the substrate (x20) surface and substantially perpendicular to the soft magnetic plate (x31) surface and either having the same magnetic direction or having an opposite magnetic direction (FIG. 5D), wherein the top surface of the more than one dipole magnets (x32-*a*1, x32-*a*2) and of the two dipole magnets (x32-*b*) of the one or more pairs is preferably is flush with the bottom surface of the soft magnetic plate (x31) and wherein the two dipole magnets (x32-*b*) of the one or more pairs preferably have their lateral surface flush with the external surface of the loop-shaped void (V) (see FIG. 6D). Preferably, the more than one dipole magnets (x32-*a*1, x32-*a*2) are laterally adjacent to each other.

The present invention further provides processes for producing the optical effect layer (OEL) described herein on the substrate (x20) such as those described herein, said process comprising the steps of:

a) applying onto the substrate (x20) surface the coating composition comprising the platelet-shaped magnetic or magnetizable pigment particles and the binder material described herein so as to form a coating layer (x10) on said substrate (x20), said coating composition being in a first liquid state;

b) exposing the coating layer (x10) to the magnetic field of the magnetic assembly (x30) described herein; and c) hardening the coating composition to a second state so as to fix the platelet-shaped magnetic or magnetizable pigment particles in their adopted positions and orientations.

The process described herein comprises a step a) of applying onto the substrate (x20) surface described herein the coating composition comprising platelet-shaped magnetic or magnetizable pigment particles described herein so as to form a coating layer, said coating composition being in a first physical state which allows its application as a layer and which is in a not yet hardened (i.e. wet) state wherein the platelet-shaped magnetic or magnetizable pigment particles can move and rotate within the binder material. Since the coating composition described herein is to be provided on a substrate surface, it is necessary that the coating composition comprising at least the binder material described herein and the platelet-shaped magnetic or magnetizable pigment particles is in a form that allows its processing on the desired printing or coating equipment. Preferably, said step a) is carried out by a printing process, preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Screen printing (also referred in the art as silkscreen printing) is a stencil process wherein an ink is transferred to a surface through a stencil supported by a fine fabric mesh of silk, mono- or multi-filaments made of synthetic fibers such as for example polyam ides or polyesters or metal threads stretched tightly on a frame made for example of wood or a metal (e.g. aluminum or stainless steel). Alternatively, the screen-printing mesh may be a chemically etched, a laser-etched, or a galvanically formed porous metal foil, e.g. a stainless steel foil. The pores of the mesh are blocked in the non-image areas and left open in the image area, the image carrier being called the screen. Screen printing might be of the flat-bed or rotary type. Screen printing is further described for example in The Printing ink manual, R. H. Leach and R. J. Pierce, Springer Edition, 5th Edition, pages 58-62 and in Printing Technology, J. M. Adams and P. A. Dolin, Delmar Thomson Learning, 5th Edition, pages 293-328.

Rotogravure (also referred in the art as gravure) is a printing process wherein the image elements are engraved into the surface of a cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink. More details are provided in "Handbook of print media", Helmut Kipphan, Springer Edition, page 48 and in The Printing ink manual, R. H. Leach and R. J. Pierce, Springer Edition, 5$^{th}$ Edition, pages 42-51.

Flexography preferably uses a unit with a doctor blade, preferably a chambered doctor blade, an anilox roller and a plate cylinder. The anilox roller advantageously has small cells whose volume and/or density determines the ink application rate. The doctor blade lies against the anilox roller, and scraps off surplus ink at the same time. The anilox roller transfers the ink to the plate cylinder which finally transfers the ink to the substrate. Specific design might be achieved using a designed photopolymer plate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in Printing Technology, J. M. Adams and P. A. Dolin, Delmar Thomson Learning, 5th Edition, pages 359-360 and in The Printing ink manual, R. H. Leach and R. J. Pierce, Springer Edition, 5th Edition, pages 33-42.

The coating composition described herein as well as the coating layer described herein comprise platelet-shaped magnetic or magnetizable pigment particles. Preferably, the platelet-shaped magnetic or magnetizable pigment particles described herein are present in an amount from about 5 wt-% to about 40 wt-%, more preferably about 10 wt-% to about 30 wt-%, the weight percentages being based on the total weight of the coating composition.

In contrast to needle-shaped pigment particles which can be considered as quasi one-dimensional particles, platelet-shaped pigment particles are quasi two-dimensional particles due to the large aspect ratio of their dimensions. Platelet-shaped pigment particle can be considered as a two-dimensional structure wherein the dimensions X and Y are substantially larger than the dimension Z. Platelet-shaped pigment particles are also referred in the art as oblate particles or flakes. Such pigment particles may be described with a main axis X corresponding to their longest dimension crossing the pigment particle and a second axis Y perpendicular to X and corresponding to the second longest dimension crossing the pigment particle. In other words, the XY plane roughly defines the plane formed by the first and second longest dimensions of the pigment particle, the Z dimension being ignored.

The platelet-shaped magnetic or magnetizable pigment particles described herein have, due to their non-spherical shape, non-isotropic reflectivity with respect to incident electromagnetic radiation for which the hardened/cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction.

In the OELs described herein, the platelet-shaped magnetic or magnetizable pigment particles described herein are dispersed in the coating composition comprising a hardened binder material that fixes the orientation of the platelet-shaped magnetic or magnetizable pigment particles. The binder material is at least in its hardened or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the particles contained in the binder material in its hardened or solid state and their orientation-dependent reflectivity can be perceived through the binder material at some wavelengths within this range. Preferably, the hardened binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the hardened binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the hardened binder material (not including the platelet-shaped magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. In this case, it is preferable that the OEL comprises luminescent pigment particles that show luminescence in response to the selected wavelength outside the visible spectrum contained in the incident radiation. The infrared, visible and UV portions of the electromagnetic spectrum approximately correspond to the wavelength ranges between 700-2500 nm, 400-700 nm, and 200-400 nm respectively.

Suitable examples of platelet-shaped magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of platelet-shaped magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation NM multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/NM/A multilayer structures, B/NM/B multilayer structures, B/A/M/B/A/multilayer structures, wherein the layers A, the magnetic layers M and the layers B are chosen from those described hereabove.

The coating composition described herein may comprise platelet-shaped optically variable magnetic or magnetizable pigment particles, and/or platelet-shaped magnetic or magnetizable pigment particles having no optically variable properties. Preferably, at least a part of the platelet-shaped magnetic or magnetizable pigment particles described herein is constituted by platelet-shaped optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed.

The use of platelet-shaped optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the platelet-shaped magnetic or magnetizable pigment particles is constituted by platelet-shaped optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 whose content is hereby incorporated by reference in its entirety.

Magnetic thin film interference pigment particles described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 whose contents are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A1/B/A^2$, wherein A1 and $A^2$ may be identical or different and each comprises at least one cholesteric layer, and B is an interlayer absorbing all or some of the light transmitted by the layers A1 and $A^2$ and imparting magnetic properties to said interlayer. U.S. Pat. No. 6,531,221 discloses platelet-shaped cholesteric multilayer pigment particles which comprise the sequence NB and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

Further, subsequently to the application of the coating composition described herein on the substrate (x20) surface described herein so as to form the coating layer (x10) (step a)), the coating layer (x10) is exposed (step b)) to the magnetic field of the magnetic assembly (x30) comprising the soft magnetic plate (x31) comprising the one or more voids (V) described herein.

Subsequently to or partially simultaneously, preferably partially simultaneously, with the steps of orienting the platelet-shaped magnetic or magnetizable pigment particles described herein (step b)), the orientation of the platelet-shaped magnetic or magnetizable pigment particles is fixed or frozen (step c)). The coating composition must thus noteworthy have a first liquid state wherein the coating composition is not yet hardened and wet or soft enough, so that the platelet-shaped magnetic or magnetizable pigment particles dispersed in the coating composition are freely movable, rotatable and orientable upon exposure to a magnetic field, and a second hardened (e.g. solid or solid-like) state, wherein the platelet-shaped magnetic or magnetizable pigment particles are fixed or frozen in their respective positions and orientations.

Such a first and second state is preferably provided by using a certain type of coating composition. For example, the components of the coating composition other than the platelet-shaped magnetic or magnetizable pigment particles may take the form of an ink or coating composition such as those which are used in security applications, e.g. for banknote printing. The aforementioned first and second states can be provided by using a material that shows an increase in viscosity in reaction to a stimulus such as for example a temperature change or an exposure to an electromagnetic radiation. That is, when the fluid binder material is hardened or solidified, said binder material converts into the second state, i.e. a hardened or solid state, where the platelet-shaped magnetic or magnetizable pigment particles are fixed in their current positions and orientations and can no longer move nor rotate within the binder material. As known to those skilled in the art, ingredients comprised in an ink or coating composition to be applied onto a surface such as a substrate and the physical properties of said ink or coating composition must fulfil the requirements of the process used to transfer the ink or coating composition to the substrate surface. Consequently, the binder material comprised in the coating composition described herein is typically chosen among those known in the art and depends on the coating or printing process used to apply the ink or coating composition and the chosen hardening process.

The OEL described herein comprises platelet-shaped magnetic or magnetizable pigment particles that, due to their shape, have non-isotropic reflectivity. The platelet-shaped magnetic or magnetizable pigment particles are dispersed in the binder material being at least partially transparent to electromagnetic radiation of one or more wavelength ranges in the range of 200 nm to 2500 nm.

The hardening step described herein (step c)) can be of purely physical nature, e.g. in cases where the coating composition comprises a polymeric binder material and a solvent and is applied at high temperatures. Then, the platelet-shaped magnetic or magnetizable pigment particles are oriented at high temperature by the application of a magnetic field, and the solvent is evaporated, followed by cooling of the coating composition. Thereby the coating composition is hardened and the orientation of the pigment particles is fixed.

Alternatively and preferably, the hardening of the coating composition involves a chemical reaction, for instance by curing, which is not reversed by a simple temperature increase (e.g. up to 80° C.) that may occur during a typical use of a security document. The term “curing” or “curable” refers to processes including the chemical reaction, cross-linking or polymerization of at least one component in the applied coating composition in such a manner that it turns into a polymeric material having a greater molecular weight than the starting substances. Preferably, the curing causes the formation of a stable three-dimensional polymeric network. Such a curing is generally induced by applying an external stimulus to the coating composition (i) after its application on a substrate (step a)) and (ii) subsequently to, or partially simultaneously with the orientation of at least part of the platelet-shaped magnetic or magnetizable pigment particles (step b)). Advantageously the hardening (step c)) of the coating composition described herein is carried out partially simultaneously with the orientation of at least a part of the platelet-shaped magnetic or magnetizable pigment particles (step c)). Therefore, preferably the coating composition is selected from the group consisting of radiation curable compositions, thermally drying compositions, oxidatively drying compositions, and combinations thereof. Particularly preferred are coating compositions selected from the group consisting of radiation curable compositions. Radiation curing, in particular UV-Vis curing, advantageously leads to an instantaneous increase in viscosity of the coating composition after exposure to the irradiation, thus preventing any further movement of the pigment particles and in consequence any loss of information after the magnetic orientation step. Preferably, the hardening step (step d)) is carried out by irradiation with UV-visible light (i.e. UV-Vis light radiation curing) or by E-beam (i.e. E-beam radiation curing), more preferably by irradiation with UV-Vis light.

Therefore, suitable coating compositions for the present invention include radiation curable compositions that may be cured by UV-visible light radiation (hereafter referred as UV-Vis-curable) or by E-beam radiation (hereafter referred as EB). According to one particularly preferred embodiment of the present invention, the coating composition described herein is a UV-Vis-curable coating composition. UV-Vis curing advantageously allows very fast curing processes and hence drastically decreases the preparation time of the OEL described herein, documents and articles and documents comprising said OEL.

Preferably, the UV-Vis-curable coating composition comprises one or more compounds selected from the group consisting of radically curable compounds and cationically curable compounds. The UV-Vis-curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis-curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

Alternatively, a polymeric thermoplastic binder material or a thermoset may be employed. Unlike thermosets, thermoplastic resins can be repeatedly melted and solidified by heating and cooling without incurring any important changes in properties. Typical examples of thermoplastic resin or polymer include without limitation polyamides, polyesters, polyacetals, polyolefins, styrenic polymers, polycarbonates, polyarylates, polyimides, polyether ether ketones (PEEK), polyetherketeoneketones (PEKK), polyphenylene based resins (e.g. polyphenylenethers, polyphenylene oxides, polyphenylene sulfides), polysulphones and mixtures of two or more thereof.

The coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The coating composition described herein may further comprise one or more additives including without limitation compounds and materials which are used for adjusting physical, rheological and chemical parameters of the composition such as the viscosity (e.g. solvents and surfactants), the consistency (e.g. anti-settling agents, fillers and plasticizers), the foaming properties (e.g. antifoaming agents), the lubricating properties (waxes), UV reactivity and stability (photosensitizers and photostabilizers) and adhesion properties, etc. Additives described herein may be present in the coating compositions described herein in amounts and in forms known in the art, including in the form of so-called nano-materials where at least one of the dimensions of the particles is in the range of 1 to 1000 nm.

The coating composition described herein may further comprise one or more marker substances or taggants and/or one or more machine readable materials selected from the group consisting of magnetic materials (different from the magnetic or magnetizable pigment particles described herein), luminescent materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The coating compositions described herein may be prepared by dispersing or mixing the magnetic or magnetizable pigment particles described herein and the one or more additives when present in the presence of the binder material described herein, thus forming liquid compositions. When present, the one or more photoinitiators may be added to the composition either during the dispersing or mixing step of all other ingredients or may be added at a later stage, i.e. after the formation of the liquid coating composition.

As described herein, the coating layer (x10) is exposed to the magnetic field of the magnetic assembly (x30) described herein.

The process for producing the OEL described herein may further comprise prior to or simultaneously with step b) a step (step b2)) of exposing the coating layer (x10) to a dynamic magnetic field of a device so as to bi-axially orient at least a part of the platelet-shaped magnetic or magnetizable pigment particles, said step being carried out prior to or simultaneously with step b) and before step c). Processes comprising such a step of exposing a coating composition to a dynamic magnetic field of a device so as to bi-axially orient at least a part of the platelet-shaped magnetic or magnetizable pigment particles are disclosed in WO 2015/086257 A1. Subsequently to the exposure of the coating layer (x10) to the magnetic field of the magnetic assembly (x30) described herein and while the coating layer (x10) is still wet or soft enough so that the platelet-shaped magnetic or magnetizable pigment particles therein can be further moved and rotated, the platelet-shaped magnetic or magnetizable pigment particles are further re-oriented by the use of the device described herein. Carrying out a bi-axial orientation means that platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the dynamic magnetic field. Effectively, this results in neighboring platelet-shaped magnetic pigment particles that are close to each other in space to be essentially parallel to each other. In order to perform a bi-axial orientation, the platelet-shaped magnetic pigment particles must be subjected to a strongly time-dependent external magnetic field.

Particularly preferred devices for bi-axially orienting the platelet-shaped magnetic or magnetizable pigment particles are disclosed in EP 2 157 141 A1. The device disclosed in EP 2 157 141 A1 provides a dynamic magnetic field that changes its direction forcing the platelet-shaped magnetic or magnetizable pigment particles to rapidly oscillate until both main axes, X-axis and Y-axis, become substantially parallel to the substrate surface, i.e. the platelet-shaped magnetic or magnetizable pigment particles rotate until they come to the stable sheet-like formation with their X and Y axes substantially parallel to the substrate surface and are planarized in said two dimensions. Other particularly preferred devices for bi-axially orienting the platelet-shaped magnetic or magnetizable pigment particles comprise linear permanent magnet Halbach arrays, i.e. assemblies comprising a plurality of magnets with different magnetization directions. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side while being weakened almost to zero on the other side. WO 2016/083259 A1 discloses suitable devices for bi-axially orienting platelet-shaped magnetic or magnetizable pigment particles, wherein said devices comprise a Halbach cylinder assembly. Other particularly preferred for bi-axially orienting the platelet-shaped magnetic or magnetizable pigment particles are spinning magnets, said magnets comprising disc-shaped spinning magnets or magnetic assemblies that are essentially magnetized along their diameter. Suitable spinning magnets or magnetic assemblies are described in U.S. Pat. No. 7,934,451 A1, said spinning magnets or magnetic assemblies generate radially symmetrical time-variable magnetic fields, allowing the bi-orientation of platelet-shaped magnetic or magnetizable pigment particles of a not yet cured or hardened coating composition. These magnets or magnetic assemblies are driven by a shaft (or spindle) connected to an external motor. CN 102529326 B discloses examples of devices comprising spinning magnets that might be suitable for bi-axially orienting platelet-shaped magnetic or magnetizable pigment particles. In a preferred embodiment, suitable devices for bi-axially orienting platelet-shaped magnetic or magnetizable pigment particles are shaft-free disc-shaped spinning magnets or magnetic assemblies constrained in a housing made of non-magnetic, preferably non-conducting, materials and are driven by one or more magnet-wire coils wound around the housing. Examples of such shaft-free disc-shaped spinning magnets or magnetic assemblies are disclosed in WO 2015/082344 A1, WO 2016/026896 A1 and in the co-pending European application 17153905.9.

The process for producing the OEL described herein comprises, a step of hardening (step c)) the coating composition, wherein said step c) is carried out preferably partially simultaneously with step b) or partially simultaneously with step b2) if a said second orientation step b2) is carried out. The step of hardening the coating composition allows the platelet-shaped magnetic or magnetizable pigment particles to be fixed in their adopted positions and orientations in a desired pattern to form the OEL, thereby transforming the coating composition to a second state. However, the time from the end of step b) to the beginning of step c) is preferably relatively short in order to avoid any de-orientation and loss of information. Typically, the time between the end of step b) and the beginning of step c) is less than 1 minute, preferably less than 20 seconds, further preferably less than 5 seconds. It is particularly preferable that there is essentially no time gap between the end of the orientation step b) (or step b2) if a second orientation step is carried out) and the beginning of the hardening step c), i.e. that step c) follows immediately after step b) or already starts while step b) is still in progress (partially simultaneously). By "partially simultaneously", it is meant that both steps are partly performed simultaneously, i.e. the times of performing each of the steps partially overlap. In the context described herein, when hardening is performed partially simultaneously with the step b) (or step b2)) if a second orientation step is carried out), it must be understood that hardening becomes effective after the orientation so that the platelet-shaped magnetic or magnetizable pigment particles orient before the complete or partial hardening of the OEL. As mentioned herein, the hardening step (step c)) may be performed by using different means or processes depending on the binder material comprised in the coating composition that also comprises the platelet-shaped magnetic or magnetizable pigment particles.

The hardening step generally may be any step that increases the viscosity of the coating composition such that a substantially solid material adhering to the substrate is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts and manganese-containing catalysts); cross-linking reactions or any combination thereof.

Radiation curing is particularly preferred, and UV-Vis light radiation curing is even more preferred, since these technologies advantageously lead to very fast curing processes and hence drastically decrease the preparation time of any article comprising the OEL described herein. Moreover, radiation curing has the advantage of producing an almost instantaneous increase in viscosity of the coating composition after exposure to the curing radiation, thus minimizing any further movement of the particles. In consequence, any loss of orientation after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapor arc lamp, as the source of the actinic radiation.

According to one embodiment, the process for producing the OEL described herein comprises the hardening step c) being a radiation curing step, preferably a UV-Vis light radiation curing step and using a photomask comprising one or more windows. Example of methods using photomasks are disclosed in WO 02/090002 A2. The photomask comprising one or more windows is positioned between the coating layer (x10) and the radiation source, thereby allowing the orientation of the platelet-shaped magnetic or magnetizable pigment particles described herein to be fixed/frozen only in the one or more regions placed under the one or more windows. The platelet-shaped magnetic or magnetizable pigment particles dispersed in the un-exposed parts of the coating layer (x10) may be re-oriented, in a subsequent step, using a second magnetic field.

The process comprising the hardening step c) being the radiation curing step, preferably the UV-Vis light radiation curing step and using the photomask described herein further comprises a step d) of exposing the coating layer (x10) to the magnetic field of a magnetic-field-generating device thereby orienting the platelet-shaped magnetic or magnetizable pigment particles in one or more regions of the coating layer (x10) which are in the first state due to the presence of the one or more regions of the photomask lacking the one or more windows, wherein said magnetic-field-generating device allow the magnetic orientation of the pigment particles so as to follow any orientation pattern except a random orientation. The devices described herein for bi-axially orienting the platelet-shaped magnetic or magnetizable pigment particles may be used for the second orientation step (step d)). The process comprising the hardening step c) being the radiation curing step, preferably the UV-Vis light radiation curing step and using the photomask described herein further and the step d) described herein further comprises a step e) of simultaneously, partially simultaneously or subsequently, preferably simultaneously or partially simultaneously, hardening the coating layer (x10) so as to fix or freeze the magnetic or magnetizable pigment particles in their adopted positions and orientations such as described hereabove.

The present invention provides a process to produce an optical effect layer (OEL) on a substrate. The substrate (x20) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs produced according to the present invention are used for decorative or cosmetic purposes including for example fingernail lacquers, said OEL may be produced on other type of substrates including nails, artificial nails or other parts of an animal or human being.

Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the optical effect layer (OEL) described herein or promote adhesion. Examples of such primer layers may be found in WO 2010/058026 A2.

With the aim of increasing the durability through soiling or chemical resistance and cleanliness and thus the circulation lifetime of an article, a security document or a decorative element or object comprising the optical effect layer (OEL) obtained by the process described herein, or with the aim of modifying their aesthetical appearance (e.g. optical gloss), one or more protective layers may be applied on top of the optical effect layer (OEL). When present, the one or more protective layers are typically made of protective varnishes. These may be transparent or slightly colored or tinted and may be more or less glossy. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the optical effect layer (OEL).

The present invention further provides optical effect layers (OEL) produced by the process according to the present invention.

The optical effect layer (OEL) described herein may be provided directly on a substrate on which it shall remain permanently (such as for banknote applications). Alternatively, an optical effect layer (OEL) may also be provided on a temporary substrate for production purposes, from which the OEL is subsequently removed. This may for example facilitate the production of the optical effect layer (OEL), particularly while the binder material is still in its fluid state. Thereafter, after hardening the coating composition for the production of the optical effect layer (OEL), the temporary substrate may be removed from the OEL.

Alternatively, in another embodiment an adhesive layer may be present on the optical effect layer (OEL) or may be present on the substrate comprising OEL, said adhesive layer being on the side of the substrate opposite to the side where the OEL is provided or on the same side as the OEL and on top of the OEL. Therefore an adhesive layer may be applied to the optical effect layer (OEL) or to the substrate, said adhesive layer being applied after the curing step has been completed. Such an article may be attached to all kinds of documents or other articles or items without printing or other processes involving machinery and rather high effort. Alternatively, the substrate described herein comprising the optical effect layer (OEL) described herein may be in the form of a transfer foil, which can be applied to a document or to an article in a separate transfer step. For this purpose, the substrate is provided with a release coating, on which the optical effect layer (OEL) are produced as described herein. One or more adhesive layers may be applied over the so produced optical effect layer (OEL).

Also described herein are substrates comprising more than one, i.e. two, three, four, etc. optical effect layers (OEL) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the optical effect layer (OEL) produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompasses by the present invention.

Further, all documents referred to throughout this specification are hereby incorporated by reference in their entirety as set forth in full herein.

EXAMPLES

A black commercial paper (Gascogne Laminates M-cote 120) was used as substrate (x20) for the examples described hereafter.

The UV-curable screen printing ink described in Table 1 was used as a coating composition comprising platelet-shaped optically variable magnetic pigment particles so as to form a coating layer (x20). The coating composition was applied on the substrate (x20) (40×30 mm), said application being carried out by hand screen printing using a T90 screen so as to form a coating layer (x10) (30×20 mm) having a thickness of about 20 μm.

TABLE 1

| | |
|---|---|
| Epoxyacrylate oligomer | 36% |
| Trimethylolpropane triacrylate monomer | 13.5% |
| Tripropyleneglycol diacrylate monomer | 20% |
| Genorad ™ 16 (Rahn) | 1% |
| Aerosil ® 200 (Evonik) | 1% |
| Speedcure TPO-L (Lambson) | 2% |
| IRGACURE ® 500 (BASF) | 6% |
| Genocure EPD (Rahn) | 2% |
| Tego ® Foamex N (Evonik) | 2% |
| Platelet-shaped optically variable magnetic pigment particles (7 layers)(*) | 16.5% |

*gold-to-green optically variable magnetic pigment particles having a flake shape of diameter d50 about 9 μm and thickness about 1 μm, obtained from Viavi Solutions, Santa Rosa, CA.

Magnetic assemblies (x30) shown in FIG. 7A-C to FIG. 15A-C were independently used to orient the platelet-shaped optically variable magnetic pigment particles in a coating layer (x10) made of the UV-curable screen printing ink described in Table 1 so as to produce the optical effect layers (OELs) shown in FIG. 7D to 15D.

The magnetic assemblies (x30) comprised a soft-magnetic plate (x31) and one or more dipole magnets (x32-*a*) and/or a pair of two dipole magnets (x32-*b*), wherein each of said one or more dipole magnets (x32-*a*) had a magnetic axis substantially perpendicular to the substrate (x20) surface and also substantially perpendicular to the soft magnetic plate (x31) surface.

Double-sided Scotch® tape were used to simulate a holder (x33). Said Double-sided Scotch® tapes (x33) were independently used to hold in place one or more of said dipole magnets (x32-*a*, x32-*b*), wherein said tape (x33) were placed below the soft magnetic plate (x31) and/or on top of the soft magnetic plate (x31) and covering the void (V).

The soft-magnetic plates (x31) were made of a composite composition (see Table 2) comprising carbonyl iron as soft magnetic particles (see Table 2). The soft magnetic plates (x31) used in Examples 1-11 were independently prepared by thoroughly mixing the ingredients of Table 2 three minutes in a speed mixer (Flack Tek Inc DAC 150 SP) at 2500 rpm. The mixture was then poured in a silicon mold and left three days to be completely hardened.

The soft magnetic plates (x31) independently comprised a loop-shaped void (V), either a circular void (V) or a square-shaped void (V), wherein said void (V) was mechanically engraved in the so-obtained soft magnetic plates (x31) by using a 1 and 2 mm diameter mesh (computer-controlled mechanical engraving machine, IS500 from Gravograph).

TABLE 2

| Ingredients | E2 |
|---|---|
| Epoxy resin (1170 from PHD-24) | 13.6 wt-% |
| Hardener (130 from PHD-24) | 4.4 wt-% |
| Carbonyl iron powder<br>BASF, spherical shape, $d_{50}$ = 4-6 μm,<br>density 7.7 $kg/dm^3$ | 82 wt-% |

After having applied the UV-curable screen printing ink as described above and after having magnetically oriented the platelet-shaped optically variable magnetic pigment particles by placing the substrate (x20) carrying the coating layer (x10) on the magnetic assemblies (x30) (see FIG. 7A-15A), the magnetically oriented platelet-shaped optically variable pigment particles were, partially simultaneously with the magnetic orientation step, fixed/frozen by UV-curing the coating layer (x20) with a UV-LED-lamp from Phoseon (Type FireFlex 50×75 mm, 395 nm, 8 $W/cm^2$).

Pictures of the so-obtained OELs were taken using the following set-up:

Light source: 150 W quartz halogen fiber optic (Fiber-lite DC-950 from Dolan-Jenner). Illumination angle is 10° w.r.t. the normal to the substrate.

1.3 MP Camera: color camera from PixeLINK (PL-B7420) with USB interface.

Objective: 0.19× telecentric lens

Color images were converted to black & white images using a free software (Fiji).

Example 1 (FIG. 7A-D)

As shown in FIG. 7A-D, an OEL was obtained by using the magnetic assembly (730) so as to orient at least a part of the platelet-shaped optically variable magnetic pigment particles of the coating layer (710) on the substrate (720).

The magnetic assembly (730) comprised i) a soft magnetic plate (731) (A1)=40 mm, (A2)=4 mm), wherein said soft magnetic plate (731) comprised a square-shaped void (V) ((A3)=10 mm), having a depth less than 100% ((A4) =3.2 mm).

The magnetic assembly (730) comprised ii) a cubic dipole magnet (732-*a*) ((A5)=3 mm, (A6)=3 mm) made of NdFeB N45, said dipole magnet (732-*a*) being disposed symmetrically within the square-shaped void (V). The dipole magnet (732-*a*) had its magnetic axis substantially perpendicular to the substrate (720) surface (also substantially perpendicular to the soft magnetic plate (731) surface) with its North Pole pointing towards said substrate (720) surface. As shown in FIG. 7C, the top surface of the dipole magnet (732-*a*) was below the top surface of the soft magnetic plate (731) and its bottom surface was flush with the top surface of the soft magnetic plate (731) in the void (V). A piece (733) of double-sided Scotch® tape (35 mm×35 mm) was applied on top of the soft magnetic plate (731) and covered the square-shaped void (V) to simulate a holder.

The distance (h) between the top surface of the soft magnetic plate (731), i.e. the top surface of the piece (733), and the substrate (720) surface was zero.

Figure 7A:
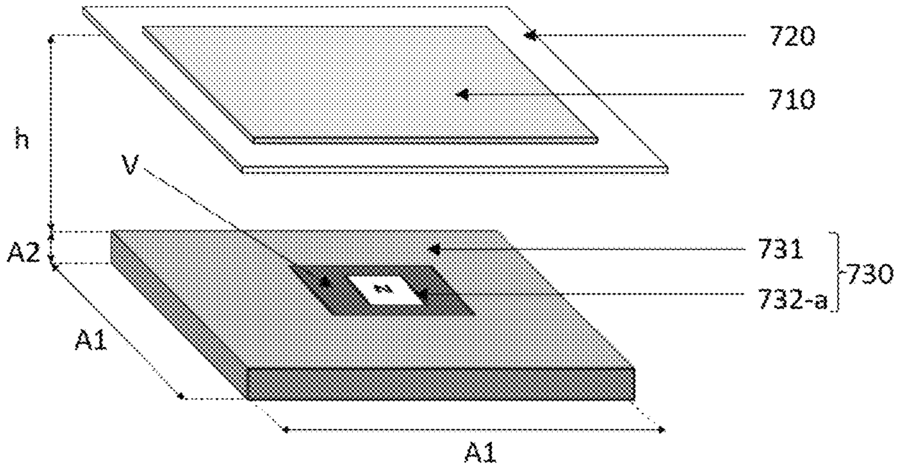
FIG. 7A-C schematically illustrates a process for producing an optical effect layer (OEL) and illustrate a top view (FIG. 7B) and a cross-section (FIG. 7C) of a magnetic assembly (730) used to produce said OEL, said process comprising the use of i) the magnetic assembly (730) so as to orient at least a part of platelet-shaped magnetic or magnetizable pigment particles of a coating layer (710) made of a coating composition comprising said platelet-shaped magnetic or magnetizable pigment particles, wherein the magnetic assembly (730) comprises i) a soft magnetic plate (731) comprising a loop-shaped, in particular a square-shaped, void (V) having a depth less than 100% and ii) a dipole magnet (732-*a*) having its magnetic axis substantially perpendicular to the soft magnetic plate (731) surface and substantially perpendicular to the substrate (720) surface, wherein said dipole magnet (732-*a*) is symmetrically disposed within the loop-shaped void (V).
Figure 7B:
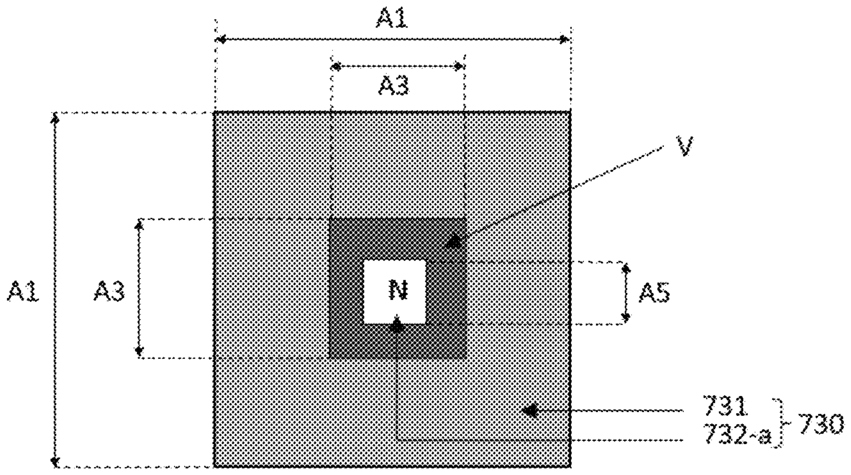
Figure 7C:
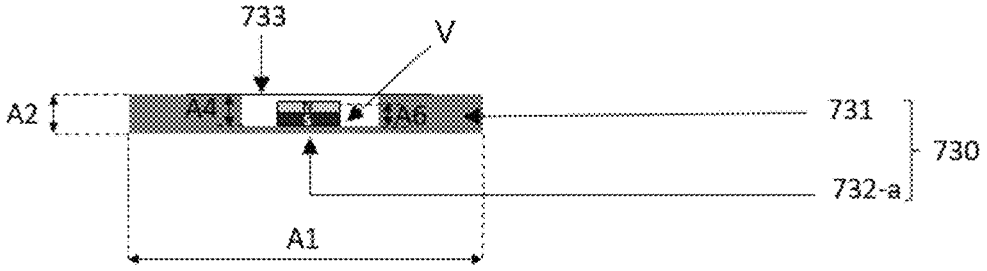
Figure 7D:
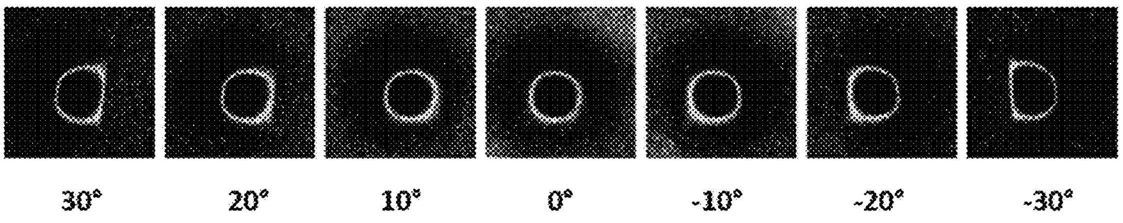
FIG. 7D shows photographic images of an OEL, said OEL being obtained by using the process and the magnetic assembly shown in FIG. 7A-C.

The resulting OEL produced with the magnetic assembly (730) illustrated in FIG. 7A-C is shown in FIG. 7D at different viewing angles by tilting the substrate (720) between 30° and −30°.

Example 2 (FIG. 8A-D)

As shown in FIG. 8A-D, an OEL was obtained by using the magnetic assembly (830) so as to orient at least a part of the platelet-shaped optically variable magnetic pigment particles of the coating layer (810) on the substrate (820).

The magnetic assembly (830) comprised i) a soft magnetic plate (831) (width (A1)=40 mm, thickness (A2)=5 mm), wherein said soft magnetic plate (831) comprised a circular void (V) ((A3)=16 mm), having a depth less than 100% ((A4)=4.2 mm).

The magnetic assembly (830) comprised ii) a cylindrical dipole magnet (832-*a*) ((A5)=5 mm, (A6)=2 mm) made of NdFeB N45, said dipole magnet (832-*a*) being symmetrically disposed below the soft magnetic plate (831) and facing the void (V). The dipole magnet (832-*a*) had its magnetic axis substantially perpendicular to the substrate (820) surface (also substantially perpendicular to the soft magnetic plate (831) surface) with its North Pole pointing towards said substrate (820) surface. As shown in FIG. 8C, the top surface of the dipole magnet (832-*a*) was flush with the bottom surface of the soft magnetic plate (831) and its bottom surface was below the bottom surface of the soft magnetic plate (831). The dipole magnet (832-*a*) was held in place using a first piece (833-*a*) of double-sided Scotch® tape (35 mm×35 mm). A second piece (833-*b*) of double-sided Scotch® tape (35 mm×35 mm) was applied on top of the soft magnetic plate (831) and covered the circular void (V) to simulate a holder.

The distance (h) between the top surface of the soft magnetic plate (831), i.e. the top surface of the second piece (833-*b*), and the substrate (820) surface was zero.

Figure 8A:
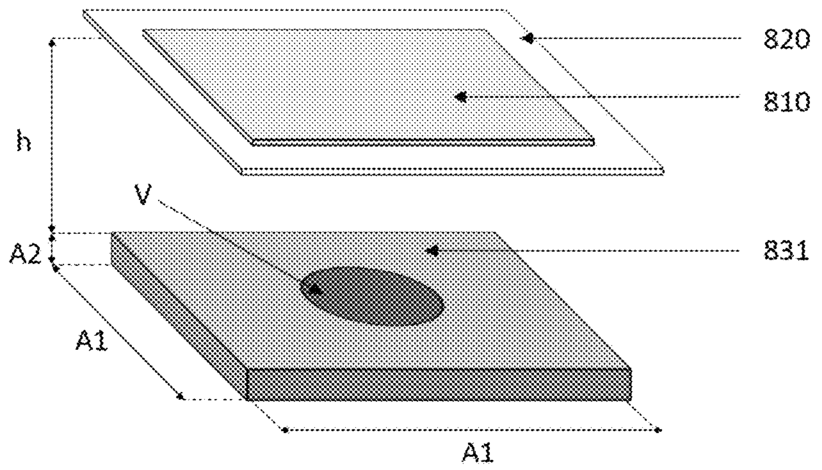
FIG. 8A-C schematically illustrates a process for producing an optical effect layer (OEL) and illustrate a top view (FIG. 8B) and a cross-section (FIG. 8C) of a magnetic assembly (830) used to produce said OEL, said process comprising the use of i) the magnetic assembly (830) so as to orient at least a part of platelet-shaped magnetic or magnetizable pigment particles of a coating layer (810) made of a coating composition comprising said platelet-shaped magnetic or magnetizable pigment particles, wherein the magnetic assembly (830) comprises i) a soft magnetic plate (831) comprising a loop-shaped, in particular a circle-shaped, void (V) having a depth less than 100% and ii) a dipole magnet (832-*a*) having its magnetic axis substantially perpendicular to the soft magnetic plate (831) surface and substantially perpendicular to the substrate (820) surface, wherein said dipole magnet (832-*a*) symmetrically faces the loop-shaped void (V).
Figure 8B:
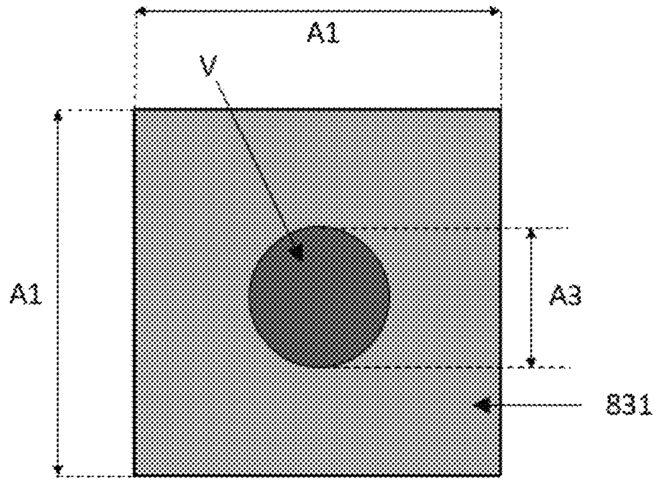
Figure 8C:
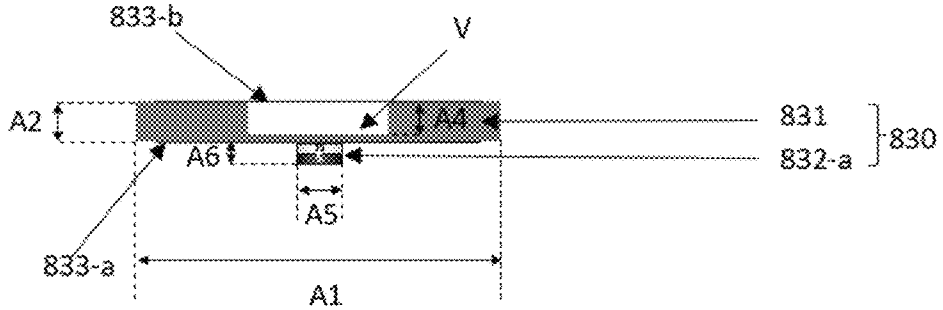
Figure 8D:
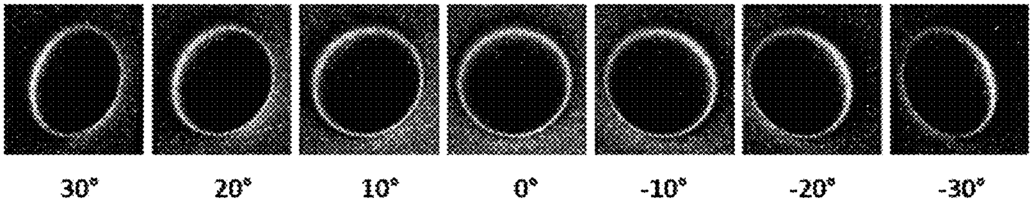
FIG. 8D shows photographic images of an OEL, said OEL being obtained by using the process and the magnetic assembly shown in FIG. 8A-C.

The resulting OEL produced with the magnetic assembly (830) illustrated in FIG. 8A-C is shown in FIG. 8D at different viewing angles by tilting the substrate (820) between 30° and −30°.

Example 3 (FIG. 9A-D)

Figure 9A:
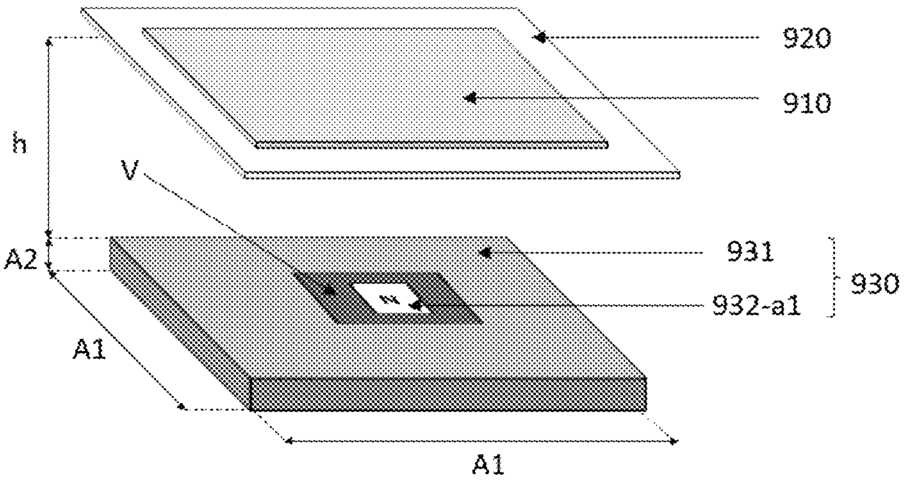
FIG. 9A-C schematically illustrates a process for producing an optical effect layer (OEL) and illustrate a top view (FIG. 9B) and a cross-section (FIG. 9C) of the magnetic assembly (930) used to produce said OEL, said process comprising the use of i) a magnetic assembly (930) so as to orient at least a part of platelet-shaped magnetic or magnetizable pigment particles of a coating layer (910) made of a coating composition comprising said platelet-shaped magnetic or magnetizable pigment particles, wherein the magnetic assembly (930) comprises i) a soft magnetic plate (931) comprising a loop-shaped, in particular a square-shaped, void (V) having a depth less than 100% and ii) two dipole magnets (932-*a*1, 932*a*-*a*2) having their magnetic axis substantially perpendicular to the soft magnetic plate (931) surface and substantially perpendicular to the substrate (920) surface and having the same magnetic direction, wherein the first dipole magnet (932-*a*1) is disposed symmetrically within the loop-shaped void (V) and the second dipole magnet (932-*a*2) is placed below the soft magnetic plate (931), below the first dipole magnet (932-*a*1) and symmetrically faces the loop-shaped void (V).
Figure 9B:
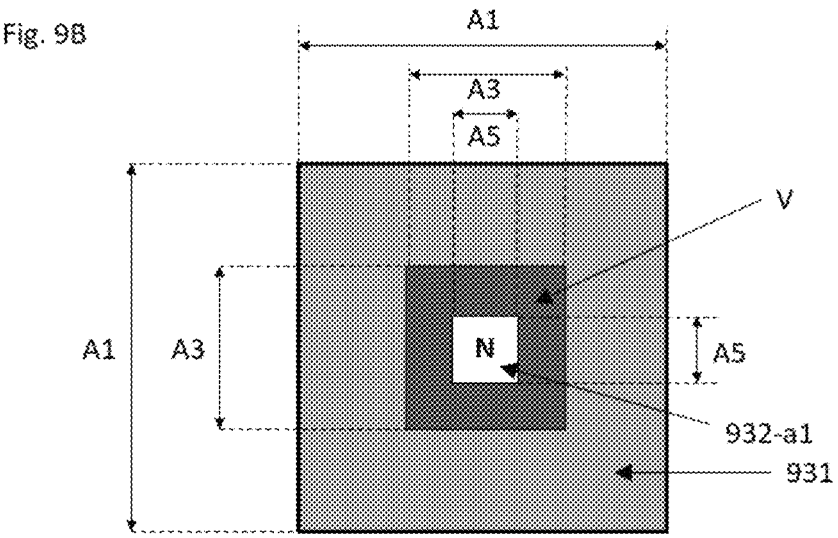
Figure 9C:
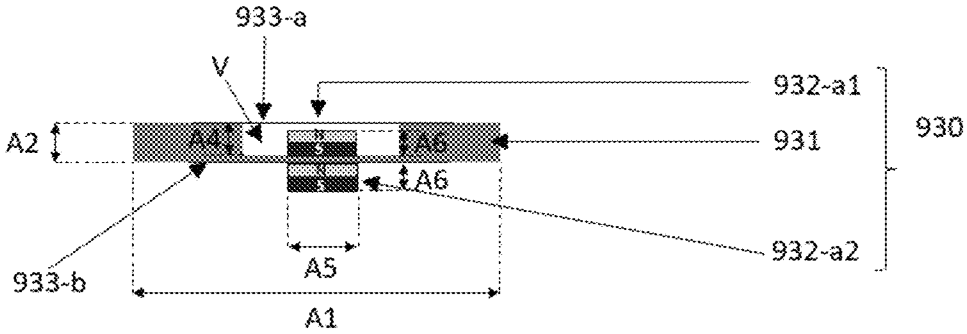

As shown in FIG. 9A-C, an OEL exhibiting an OEL exhibiting a loop was obtained by using the magnetic assembly (930) so as to orient at least a part of the platelet-shaped optically variable magnetic pigment particles of the coating layer (910) on the substrate (920).

The magnetic assembly (930) comprised i) a soft magnetic plate (931) ((A1)=40 mm, (A2)=4 mm), wherein said soft magnetic plate (931) comprised a square-shaped void (V) ((A3)=10 mm) having a depth less than 100% ((A4)=3.2 mm).

The magnetic assembly (930) comprised ii) two cubic dipole magnets (932-*a*1, 932-*a*2) ((A5)=3 mm, (A6)=3 mm) made of NdFeB N45, wherein the first dipole magnet (932-*a*1) was disposed symmetrically within the void (V) and the second dipole magnet (932-*a*2) was symmetrically disposed below the soft magnetic plate (931), below the first dipole magnet (932-*a*1) and was facing the void (V). The dipole magnets (932-*a*1, 932-*a*2) had their magnetic axis substantially perpendicular to the substrate (920) surface (also substantially perpendicular to the soft magnetic plate (931) surface) with both their North Poles pointing towards said substrate (920) surface. As shown in FIG. 9C, the top surface of the first dipole magnet (932-*a*1) was below the top surface the soft magnetic plate (931) and its bottom surface was flush with the top surface of the soft magnetic plate (931) in the void (V). As shown in FIG. 9C, the top surface of the second dipole magnet (932-*a*2) was flush with the bottom surface of the soft magnetic plate (931) and its bottom surface was below the bottom surface of the soft magnetic plate (931). The second dipole magnet (932-*a*2) was held in place using a first piece (933-*a*) of double-sided Scotch® tape (35 mm×35 mm). A second piece (933-*b*) of double-sided Scotch® tape (35 mm×35 mm) was applied on top of the top surface of the soft magnetic plate (931) and covered the square-shaped void (V) to simulate a holder.

The distance (h) between the top surface of the soft magnetic plate (931), i.e. the top surface of the second piece (933-*b*), and the substrate (920) surface was zero.

Figure 9D:
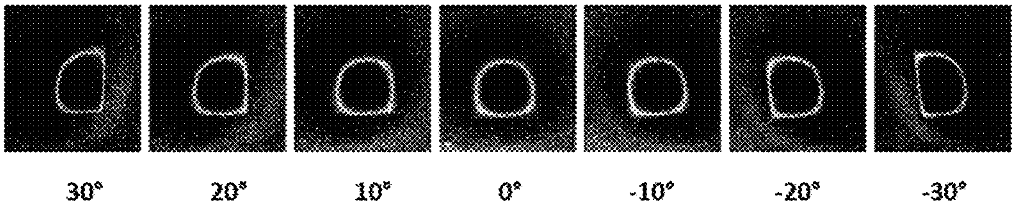
FIG. 9D shows photographic images of an OEL, said OEL being obtained by using the process and the magnetic assembly shown in FIG. 9A-C.

The resulting OEL produced with the magnetic assembly (930) illustrated in FIG. 9A-C is shown in FIG. 9D at different viewing angles by tilting the substrate (920) between 30° and −30°.

Example 4 (FIG. 10A-D)

Figure 10A:
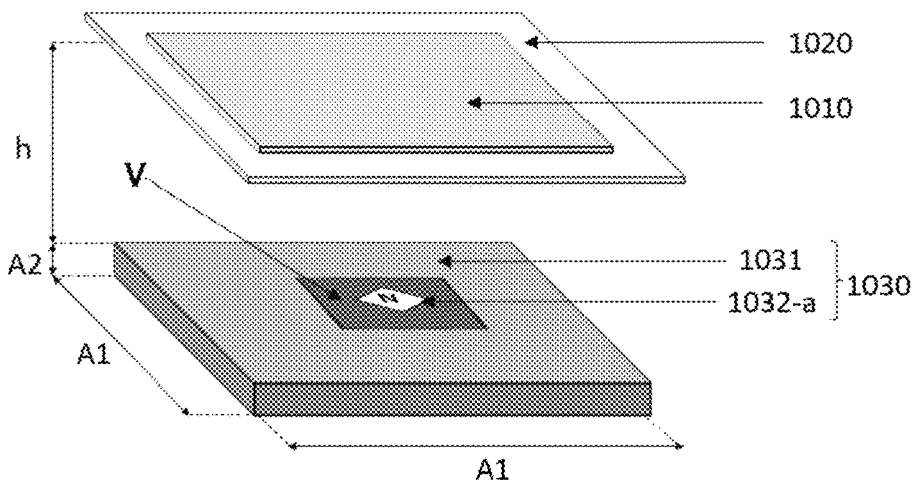
FIG. 10A-C schematically illustrates a process for producing an optical effect layer (OEL) and illustrate a top view (FIG. 10B) and a cross-section (FIG. 10C) of a magnetic assembly (1030) used to produce said OEL, said process comprising the use of i) the magnetic assembly (1030) so as to orient at least a part of platelet-shaped magnetic or magnetizable pigment particles of a coating layer (1010) made of a coating composition comprising said platelet-shaped magnetic or magnetizable pigment particles, wherein the magnetic assembly (1030) comprises i) a soft magnetic plate (1031) comprising a loop-shaped, in particular a square-shaped, void (V) having a depth less than 100% and ii) two dipole magnets (1032-*a*1, 1032*a*-*a*2) having their magnetic axis substantially perpendicular to the soft magnetic plate (1031) surface and substantially perpendicular to the substrate (1020) surface and having the same magnetic direction, wherein the first dipole magnet (1032-*a*1) is disposed symmetrically within the loop-shaped void (V) and the second dipole magnet (1032-*a*2) is placed below the soft magnetic plate (1031), below the first dipole magnet (1032-*a*1) and symmetrically faces the loop-shaped void (V).
Figure 10B:
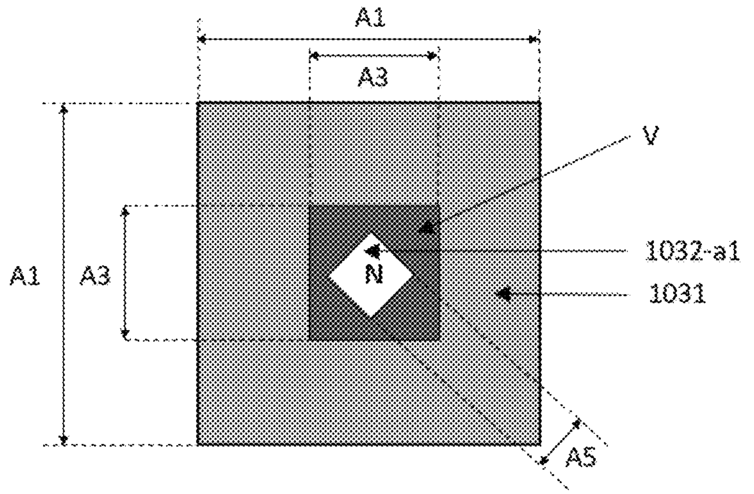
Figure 10C:
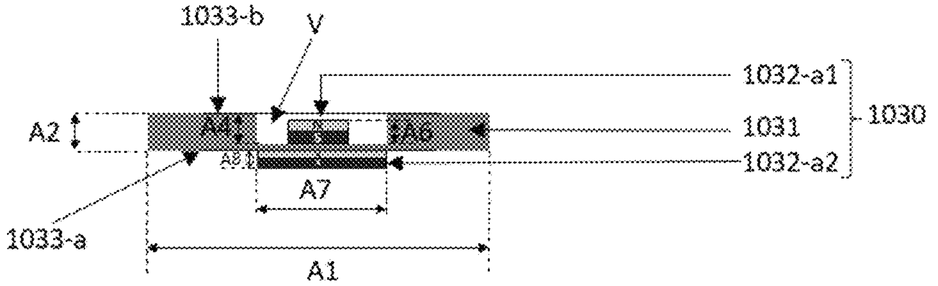

As shown in FIG. 10A-C, an OEL was obtained by using the magnetic assembly (1030) so as to orient at least a part of the platelet-shaped optically variable magnetic pigment particles of the coating layer (1010) on the substrate (1020).

The magnetic assembly (1030) comprised i) a soft magnetic plate (931) ((A1)=40 mm, (A2)=4 mm), wherein said soft magnetic plate (1031) comprised a square-shaped void (V) ((A3)=13 mm) having a depth less than 100% ((A4)=3.2 mm).

The magnetic assembly (930) comprised ii) two cubic dipole magnets (1032-*a*1, 1032-*a*2) ((A5)=3 mm, (A6)=3 mm, (A7)=10 mm, (A8)=1 mm) made of NdFeB N45, wherein the first dipole magnet (1032-*a*1) was disposed symmetrically within the void (V) and the second dipole magnet (1032-*a*2) was symmetrically disposed below the soft magnetic plate (1031), below the first dipole magnet (1032-*a*1) and was facing the void (V).

The first cubic dipole magnet (1032-*a*1) was tilted and had its sides (A5) crossing the sides (A3) of the void (V) at an angle of about 45°. The second cubic dipole magnet (1032-*a*1) was aligned with the void (V) and had its sides (A7) parallel to the sides (A3) of the soft-magnetic plate (1031). The dipole magnets (1032-*a*1, 1032-*a*2) had their magnetic axis substantially perpendicular to the substrate (1020) surface (also substantially perpendicular to the soft magnetic plate (1031) surface) with both their North Poles pointing towards said substrate (1020) surface. As shown in FIG. 10C, the top surface of the first dipole magnet (1032-*a*1) was below the top surface the soft magnetic plate (1031) and its bottom surface was flush with the top surface of the soft magnetic plate (931) in the void (V). As shown in FIG. 9C, the top surface of the second dipole magnet (1032-*a*2) was flush with the bottom surface of the soft magnetic plate (1031) and its bottom surface was below the bottom surface of the soft magnetic plate (1031). The second dipole magnet (1032-*a*2) was held in place using a first piece (1033-*a*) of double-sided Scotch® tape (35 mm×35 mm). A second piece (1033-*b*) of double-sided Scotch® tape (35 mm×35 mm) was applied on top of the soft magnetic plate (1031) and covered the square-shaped void (V) to simulate a holder.

The distance (h) between the top surface of the soft magnetic plate (1031), i.e. the top surface of the second piece (1033-*b*), and the substrate (1020) surface was zero.

Figure 10D:
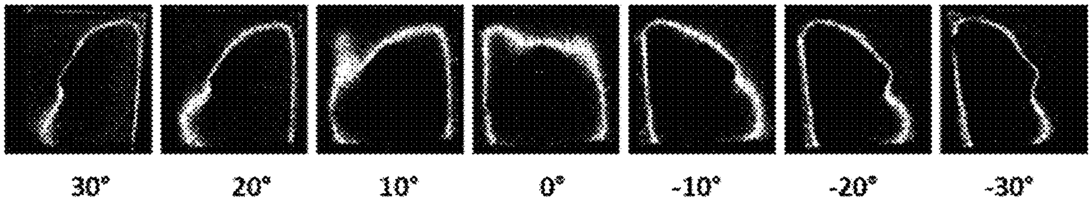
FIG. 10D shows photographic images of an OEL, said OEL being obtained by using the process and the magnetic assembly shown in FIG. 10A-C.

The resulting OEL produced with the magnetic assembly (1030) illustrated in FIG. 10A-C is shown in FIG. 10D at different viewing angles by tilting the substrate (1020) between 30° and −30°.

Example 5 (FIG. 11A-D)

Figure 11A:
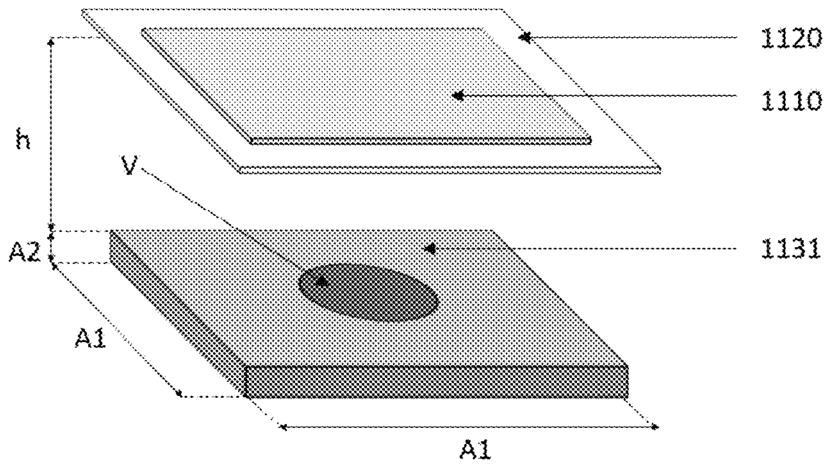
FIG. 11A-C schematically illustrates a process for producing an optical effect layer (OEL) and illustrate a top view (FIG. 11B) and a cross-section (FIG. 11C) of a magnetic assembly (1130) used to produce said OEL, said process comprising the use of i) a magnetic assembly (1130) so as to orient at least a part of platelet-shaped magnetic or magnetizable pigment particles of a coating layer (1110) made of a coating composition comprising said platelet-shaped magnetic or magnetizable pigment particles, wherein the magnetic assembly (1130) comprises i) a soft magnetic plate (1131) comprising a loop-shaped, in particular a circle-shaped, void (V) having a depth less than 100% and ii) a pair of two dipole magnets (1132-*b*) having their magnetic axis substantially perpendicular to the soft magnetic plate (1131) surface and substantially perpendicular to the substrate (1120) surface and having the same magnetic direction, wherein said two dipole magnets 1132-*b*) are disposed below the soft magnetic plate (1131) and are spaced apart from the loop-shaped void (V).
Figure 11B:
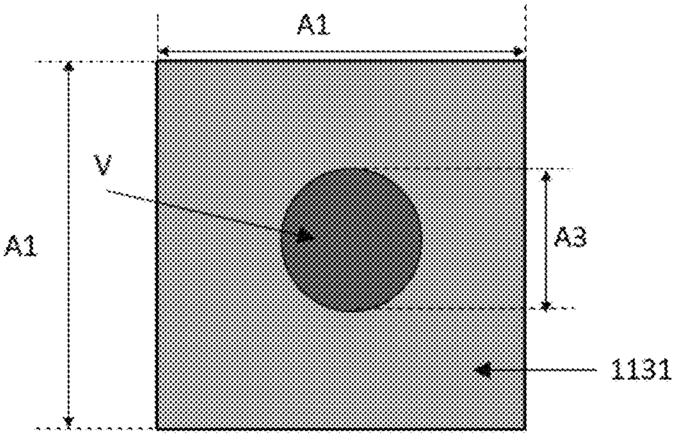
Figure 11C:
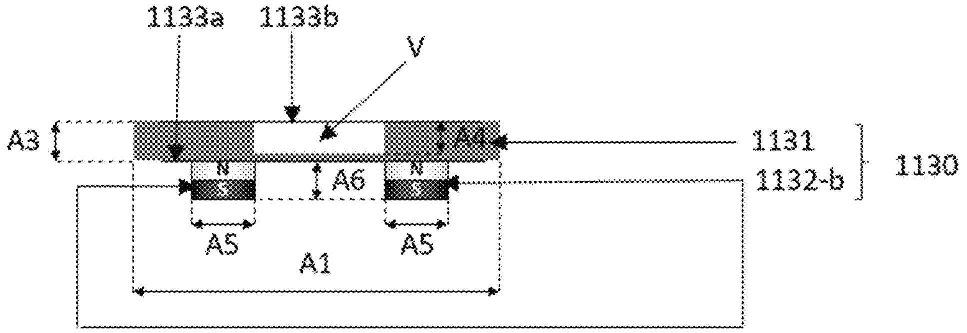

As shown in FIG. 11A-C, an OEL was obtained by using the magnetic assembly (1130) so as to orient at least a part of the platelet-shaped optically variable magnetic pigment particles of the coating layer (1110) on the substrate (1120).

The magnetic assembly (1130) comprised i) a soft magnetic plate (1131) (width (A1)=40 mm, thickness (A2)=5 mm), wherein said soft magnetic plate (1131) comprised a circular void (V) ((A3)=16 mm) having a depth less than 100% ((A4)=4.2 mm).

The magnetic assembly (1130) comprised ii) a pair of two cylindrical dipole magnets (1132-*b*) ((A5)=4 mm, (A6)=2 mm) made of NdFeB N45, said two dipole magnets (1132-*b*) being symmetrically disposed below soft magnetic plate (1131) and were spaced apart from the void (V). The dipole magnets (1132-*b*) had their magnetic axis substantially perpendicular to the substrate (1120) surface (also substantially perpendicular to the soft magnetic plate (1131) surface) with both their North Poles pointing towards said substrate (1120) surface. As shown in FIG. 11C, the top surface of the two dipole magnets (1132-*b*) was flush with the bottom surface of the soft magnetic plate (1131) and the lateral surface of each of them was flush with the internal surface of the void (V). In other words, the internal edge or surface of each of the dipole magnets (1132-*b*) was superimposed with the edge or surface of the void (V). The dipole magnets (1132-*b*) were held in place using a first piece (1133-*a*) of double-sided Scotch® tape (35 mm×35 mm). A second piece (1133-*b*) of double-sided Scotch® tape (35 mm×35 mm) was applied on top of the soft magnetic plate (1131) and covered the circular void (V) to simulate a holder.

The distance (h) between the top surface of the soft magnetic plate (1131), i.e. the top surface of the second piece (1133-*b*), and the substrate (1120) surface was zero.

Figure 11D:
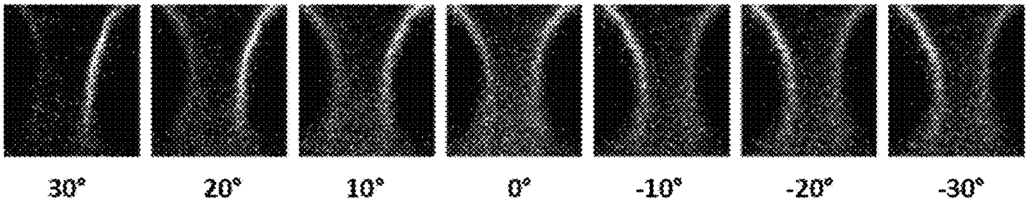
FIG. 11D shows photographic images of an OEL, said OEL being obtained by using the process shown in FIG. 11A.

The resulting OEL produced with the magnetic assembly (1130) illustrated in FIG. 11A-C is shown in FIG. 11D at different viewing angles by tilting the substrate (1120) between 30° and −30°.

Example 6 (FIG. 12A-D)

As shown in FIG. 12A-C, an OEL was obtained by using the magnetic assembly (1230) so as to orient at least a part of the platelet-shaped optically variable magnetic pigment particles of the coating layer (1210) on the substrate (1220).

The magnetic assembly (1230) comprised i) a soft magnetic plate (1231) ((A1)=40 mm, (A2)=5 mm), wherein said soft magnetic plate (1231) comprised a circular void (V) ((A3)=16 mm) having depth less than 100% ((A4)=4.2 mm).

The magnetic assembly (1230) comprised ii) a pair of two cylindrical dipole magnets (1232-*b*) ((A5)=4 mm, (A6)=2 mm) made of NdFeB N45, said two dipole magnets (1232-*b*) being symmetrically disposed below soft magnetic plate (1231) and were spaced apart from the void (V). The dipole magnets (1232-*b*) had their magnetic axis substantially perpendicular to the substrate (1220) surface (also substantially perpendicular to the soft magnetic plate (1231) surface) with the North Pole of one of said dipole magnets (1232-*b*) pointing towards said substrate (1220) surface, and with the South Pole of the other of said dipole magnets (1232-*b*) pointing towards said substrate (1220) surface. As shown in FIG. 12C, the top surface of the two dipole magnets (1232-*b*) was flush with the bottom surface of the soft magnetic plate (1231) and the lateral surface of each of them was flush with the internal surface of the void (V). In other words, the internal edge or surface of each of the dipole magnets (1232-*b*) was superimposed with the edge or surface of the void (V). The dipole magnets (1232-*b*) were held in place using a first piece (1233-*a*) of double-sided Scotch® tape (35 mm×35 mm). A second piece (1233-*b*) of double-sided Scotch® tape (35 mm×35 mm) was applied on top of the soft magnetic plate (1231) and covered the circular void (V) to simulate a holder.

The distance (h) between the top surface of the soft magnetic plate (1231), i.e. the top surface of the second piece (1233-*b*), and the substrate (1220) surface was zero.

The resulting OEL produced with the magnetic assembly (1230) illustrated in FIG. 12A-C is shown in FIG. 12D at different viewing angles by tilting the substrate (1220) between 30° and −30°.

Example 7 (FIG. 13A-D)

As shown in FIG. 13A-D, an OEL was obtained by using the magnetic assembly (1330) so as to orient at least a part of the platelet-shaped optically variable magnetic pigment particles of the coating layer (1310) on the substrate (1320).

The magnetic assembly (1330) comprised i) a soft magnetic plate (1331) ((A1)=40 mm, (A2)=5 mm), wherein said soft magnetic plate (1331) comprised a circular void (V) ((A3)=11 mm) having a depth of 100% ((A2)=5 mm).

The magnetic assembly (1330) comprised ii) a cylindrical dipole magnet (1332-*a*) ((A4)=5 mm, (A2)=5 mm) made of NdFeB N45, said dipole magnet (1332-*a*) being disposed symmetrically within the void (V). The dipole magnet (1332-*a*) had its magnetic axis substantially perpendicular to the substrate (1320) surface (also substantially perpendicular to the soft magnetic plate (1331) surface) with its North Pole pointing towards said substrate (1320) surface. As shown in FIG. 13C, the top surface of the dipole magnet (1332-*a*) was flush with the top surface of the soft magnetic plate (1331) and its bottom surface was flush with the bottom surface of the soft magnetic plate (1331) in the void (V). The dipole magnet (1332-*a*) was held in place using a first and second pieces (1333-*a*, 1333-*b*) of double-sided Scotch® tape (35 mm×35 mm). The second piece (1333-*b*) was applied on top of the soft magnetic plate (1331) and covered the circular void (V) to simulate a holder.

The distance (h) between the top surface of the soft magnetic plate (1331), i.e. the top surface of the second piece (1333-*b*), and the substrate (1320) surface was zero.

The resulting OEL produced with the magnetic assembly (1330) illustrated in FIG. 13A-C is shown in FIG. 13D at different viewing angles by tilting the substrate (1320) between 30° and −30°.

Example 8 (FIG. 14A-D)

As shown in FIG. 14A-C, an OEL was obtained by using the magnetic assembly (1430) so as to orient at least a part of the platelet-shaped optically variable magnetic pigment particles of the coating layer (1410) on the substrate (1420).

The magnetic assembly (1430) comprised i) a soft magnetic plate (1431) ((A1)=40 mm, (A2)=5 mm), wherein said soft magnetic plate (1431) comprised a circular void (V) ((A3)=18 mm) having a depth of 100% ((A2)=5 mm).

The magnetic assembly (1430) comprised ii) a cylindrical dipole magnet (1432-*a*) ((A5)=5 mm, (A6)=2 mm) made of NdFeB N45, said dipole magnet (1432-*a*) being symmetrically disposed below soft magnetic plate (1431) and facing the void (V). The dipole magnet (1432-*a*) had its magnetic axis substantially perpendicular to the substrate (1420) surface (also substantially perpendicular to the soft magnetic plate (1431) surface) with its North Pole pointing towards said substrate (1420) surface. As shown in FIG. 14C, the top surface of the dipole magnet (1432-*a*) was flush with the bottom surface of the soft magnetic plate (1431) and its bottom surface was below the bottom surface of the soft magnetic plate (1431). The dipole magnet (1432-*a*) was held in place using a first piece (1433-*a*) of double-sided Scotch® tape (35 mm×35 mm). A second piece (1433-*b*) of double-sided Scotch® tape (35 mm×35 mm) was applied on top of the top surface of the soft magnetic plate (1431) and covered the circular void (V) to simulate a holder to simulate a holder.

The distance (h) between the top surface of the soft magnetic plate (1431), i.e. the top surface of the second piece (1433-*b*), and the substrate (1420) surface was zero.

The resulting OEL produced with the magnetic assembly (1430) illustrated in FIG. 14A-C is shown in FIG. 14D at different viewing angles by tilting the substrate (1420) between 30° and −30°.

Example 9 (FIG. 15A-D)

As shown in FIG. 15A-C, an OEL was obtained by using the magnetic assembly (1530) so as to orient at least a part of the platelet-shaped optically variable magnetic pigment particles of the coating layer (1510) on the substrate (1520).

The magnetic assembly (1530) comprised i) a soft magnetic plate (1531) ((A1)=40 mm, (A2)=2 mm), wherein said soft magnetic plate (1531) comprised a circular-shaped void (V) ((A3)=10 mm) having a depth of 100% ((A2)=2 mm).

The magnetic assembly (1530) comprised ii) two cylindrical dipole magnets (1532-*a*1, 1532-*a*2) (A(4)=3 mm, (A5)=4 mm, (A6)=2 mm) made of NdFeB N45, wherein the first dipole magnet (1532-*a*1) was disposed symmetrically within the void (V) and the second dipole magnet (1532-*a*2) was symmetrically disposed below the soft magnetic plate (1531), below the first dipole magnet (1532-*a*1) and was facing the void (V). The dipole magnets (1532-*a*1, 1532-*a*2) had their magnetic axis substantially perpendicular to the substrate (1520) surface (also substantially perpendicular to the soft magnetic plate (1531) surface) with both their North Poles pointing towards said substrate (1520) surface. As shown in FIG. 15C, the top surface of the first dipole magnet (1532-*a*1) is flush with the top surface of the soft magnetic plate (1531) and its bottom surface was flush with the bottom surface of the soft magnetic plate (1531) in the void (V). As shown in FIG. 15C, the top surface of the second dipole magnet (1532-*a*2) was flush with the bottom surface of the soft magnetic plate (1531) and its bottom surface was below the bottom surface of the soft magnetic plate (1531). The first and second dipole magnets (1532-*a*1, 1532-*a*2) were held in place using a first piece (1533-*a*) of double-sided Scotch® tape (35 mm×35 mm). A second piece (1533-*b*) of double-sided Scotch® tape (35 mm×35 mm) was applied on top of the soft magnetic plate (1531) and covered the circular-shaped void (V) to simulate a holder.

The distance (h) between the top surface of the soft magnetic plate (1531), i.e. the top surface of the second piece (1533-*b*), and the substrate (1520) surface was zero.

The resulting OEL produced with the magnetic assembly (1530) illustrated in FIG. 15A-C is shown in FIG. 15D at different viewing angles by tilting the substrate (1520) between 30° and −30°.

Example 10 (FIG. 16A-D)

As shown in FIG. 16A-D, an OEL was obtained by using the magnetic assembly (1630) so as to orient at least a part of the platelet-shaped optically variable magnetic pigment particles of the coating layer (1610) on the substrate (1620).

The magnetic assembly (1630) comprised i) a soft magnetic plate (1631) (A1)=40 mm, (A2)=5 mm), wherein said soft magnetic plate (1631) comprised a circular-shaped void (V) ((A3)=16 mm), having a depth less than 100% ((A4) =4.2 mm).

The magnetic assembly (1630) comprised ii) two cylindrical dipole magnets (1632-*a*1 and 1632-*a*2) ((A5)=5 mm, (A6)=3 mm) made of NdFeB N45, said dipole magnet (1632-*a*1 and 1632-*a*2) being disposed within the circular-shaped void (V). The two cylindrical dipole magnets (1632-*a*1 and 1632-*a*2) had its magnetic axis substantially perpendicular to the substrate (1620) surface (also substantially perpendicular to the soft magnetic plate (1631) surface) with opposite magnetic direction, the South pole of the first cylindrical dipole magnets (1632-*a*1) pointing towards the substrate (1620) surface and the North pole of the second cylindrical dipole magnets (1632-*a*2) pointing towards the substrate (1620) surface. As shown in FIG. 16C, the lateral surface of each of the two cylindrical dipole magnets (1632-*a*1 and 1632-*a*2) was flush with the internal surface of the circular-shaped void (V). The two cylindrical dipole magnets (1632-*a*1 and 1632-*a*2) were laterally spaced apart and a distance of 6 mm was present between them. The center of the two cylindrical dipole magnets (1632-*a*1 and 1632-*a*2) was disposed on a diameter of the circular-shaped void (V). A piece (1633) of double-sided Scotch® tape (35 mm×35 mm) was applied on top of the soft magnetic plate (1631) and covered the circular-shaped void (V) to simulate a holder.

The distance (h) between the top surface of the soft magnetic plate (1631), i.e. the top surface of the piece (1633), and the substrate (1620) surface was zero.

The resulting OEL produced with the magnetic assembly (1630) illustrated in FIG. 16A-C is shown in FIG. 16D at different viewing angles by tilting the substrate (1620) between 30° and −30°.

Example 11 (FIG. 17A-D)

As shown in FIG. 17A-D, an OEL was obtained by using the magnetic assembly (1730) so as to orient at least a part of the platelet-shaped optically variable magnetic pigment particles of the coating layer (1710) on the substrate (1720).

The magnetic assembly (1730) comprised i) a soft magnetic plate (1731) (A1)=40 mm, (A2)=5 mm), wherein said soft magnetic plate (1731) comprised a circular-shaped void (V) ((A3)=16 mm), having a depth less than 100% ((A4) =4.2 mm).

The magnetic assembly (1730) comprised ii) two cylindrical dipole magnets (1732-*a*1 and 1732-*a*2) ((A5)=5 mm, (A6)=3 mm) made of NdFeB N45, said dipole magnet (1732-*a*1 and 1732-*a*2) being disposed within the circular-shaped void (V). The two cylindrical dipole magnets (1732-*a*1 and 1732-*a*2) had its magnetic axis substantially perpendicular to the substrate (1720) surface (also substantially perpendicular to the soft magnetic plate (1731) surface) with opposite magnetic direction, the South pole of the first cylindrical dipole magnets (1732-*a*1) pointing towards the substrate (1720) surface and the North pole of the second cylindrical dipole magnets (1732-*a*2) pointing towards the substrate (1720) surface. As shown in FIG. 17C, the center of the two cylindrical dipole magnets (1732-*a*1 and 1732-*a*2) was disposed on a diameter of the circular-shaped void (V). The two cylindrical dipole magnets (1732-*a*1 and 1732-*a*2) was jointly disposed at the center of the circular-shaped void (V) (i.e. the center of the two cylindrical dipole magnets (1732-*a*1 and 1732-*a*2) was aligned with the center of the void) and were held in contact by the magnetic force acting between them. A piece (1733) of double-sided Scotch® tape (35 mm×35 mm) was applied on top of the soft magnetic plate (1731) and covered the circular-shaped void (V) to simulate a holder.

The distance (h) between the top surface of the soft magnetic plate (1731), i.e. the top surface of the piece (1733), and the substrate (1720) surface was zero.

The resulting OEL produced with the magnetic assembly (1730) illustrated in FIG. 17A-C is shown in FIG. 17D at different viewing angles by tilting the substrate (1720) between 30° and −30°.

The invention claimed is:

1. A magnetic assembly mounted on a transferring device and comprising i) a soft magnetic plate made of a composite comprising from about 25 wt-% to about 95 wt-% of spherical soft magnetic particles dispersed in a non-magnetic material, the weight percents being based on the total weight of the soft magnetic plate, wherein the soft magnetic plate comprises one or more voids, wherein each of the one or more voids either completely extends through the soft magnetic plate or partially extends through the soft magnetic plate, and ii) one or more dipole magnets, wherein the one or more dipole magnets are permanent dipole magnets, and wherein the one or more dipole magnets are disposed within the one or more voids and/or are outside of the one or more voids and facing the one or more voids, wherein if any of the one or more dipole magnets are disposed within any of the one or more voids, either (a) more than one dipole magnet is disposed within a single void of the one or more voids and some of the dipole magnets disposed within the single void have opposite magnetic directions, or b) one or more of the dipole magnets facing at least one of the one or more voids are also present, and wherein if any of the one or more dipole magnets are outside of the one or more voids and facing the one or more voids, the dipole magnets outside of and facing the one or more voids are below the soft magnetic plate and the dipole magnets outside of and facing the one or more voids are directly under the one of the one or more voids.

2. The magnetic assembly according to claim 1, wherein said magnetic assembly is disposed in a holder mounted on a transferring device being a rotating magnetic cylinder and wherein the soft magnetic plate has a curved surface fitting with the curved surface of the rotating magnetic cylinder.

3. The magnetic assembly according to claim 1, wherein each of said one or more dipole magnets has its magnetic axis substantially perpendicular to the soft magnetic plate surface and all of said one or more dipole magnets facing said one or more voids have a same magnetic direction.

4. The magnetic assembly according to claim 1, wherein a polymeric matrix of the soft magnetic plate comprises or consists of one or more thermoplastic materials selected from the group consisting of polyamides, co-polyamides, polyphtalimides, polyolefins, polyesters, polytetrafluoroethylenes, polyacrylates, polymethacrylates, polyimides, polyetherimides, polyetheretherketones, polyaryletherketones, polyphenylene sulfides, liquid crystal polymers, polycarbonates and mixtures thereof or one or more thermosetting materials selected from the group consisting of epoxy resins, phenolic resins, polyimide resins, silicon resins and mixtures thereof, and wherein the spherical soft magnetic particles are selected from the group consisting of carbonyl iron, carbonyl nickel, cobalt and combinations thereof and have a d50 between about 0.5 μm and about 100 μm.

5. The magnetic assembly according to claim 1, wherein the soft magnetic plate has a thickness of at least about 0.5 mm.

6. The magnetic assembly according to claim 1, wherein the soft magnetic plate has a thickness of at least about 1 mm.

7. The magnetic assembly according to claim 1, wherein the soft magnetic plate has a thickness between about 1 mm and about 5 mm.

8. The magnetic assembly according to claim 1, wherein the one or more dipole magnets are disposed within the one or more voids.

9. A printing apparatus comprising a transferring device and at least one of the magnetic assemblies recited in claim 1.

10. The printing apparatus according to claim 9, wherein the transferring device is a rotating magnetic cylinder comprising at least one of the magnetic assemblies mounted thereon.

11. A process for producing an optical effect layer exhibiting one or more indicia on a substrate, said process comprising the steps of:

a) applying onto a substrate surface a coating composition comprising i) platelet-shaped magnetic or magnetizable pigment particles and ii) a binder material so as to form a coating layer on said substrate, said coating composition being in a first liquid state;

b) exposing the coating layer to a magnetic field of the magnetic assembly recited in claim 1; and c) hardening the coating composition to a second state so as to fix the platelet-shaped magnetic or magnetizable pigment particles in their adopted positions and orientations.

12. The process according to claim 11, wherein the platelet-shaped magnetic or magnetizable pigment particles are platelet-shaped optically variable magnetic or magnetizable pigment particles selected from the group consisting of platelet-shaped magnetic thin-film interference pigment particles, platelet-shaped magnetic cholesteric liquid crystal pigment particles, platelet-shaped interference coated pigment particles comprising a magnetic material and mixtures of two or more thereof.

13. The process according to claim 11 further comprising a step of exposing the coating layer to a dynamic magnetic field of a device so as to bi-axially orient at least a part of the platelet-shaped magnetic or magnetizable pigment particles, said step occurring prior to or simultaneously with step b) and before step c).

14. The magnetic assembly according to claim 1, wherein the magnetic assembly further comprises one or more pairs of two dipole magnets disposed below the soft magnetic plate, wherein each pair of the one or more pairs of two dipole magnets are spaced apart from one another by the width of the one or more voids.

15. The magnetic assembly according to claim 14, wherein each of the dipole magnets of the one or more pairs has its magnetic axis substantially perpendicular to the soft magnetic plate surface and each pair of said one or more pairs has two dipole magnets having a same magnetic direction or having an opposite magnetic direction.

16. The magnetic assembly according to claim 14, wherein one of the one or more dipole magnets has a magnetic axis substantially parallel to the soft magnetic plate surface, wherein said dipole magnet is disposed within the one or more voids or is facing said one or more voids and one or more pairs of two dipole magnets, wherein the one or more pairs of dipole magnets are disposed below the soft magnetic plate and are spaced apart from the one or more voids.

17. The magnetic assembly according to claim 14, wherein the lateral surface of two dipole magnets of said one or more pairs of two dipole magnets is flush with the external surface of the one or more voids.

18. The magnetic assembly according to claim 17, wherein the one or more pairs of two dipole magnets are attached to a side of the soft magnetic plate opposite from a side that is configured for placement of a substrate.

* * * * *